(12) United States Patent
Rink et al.

(10) Patent No.: US 11,254,283 B2
(45) Date of Patent: Feb. 22, 2022

(54) BELT RETRACTOR

(71) Applicant: TRW Automotive GmbH, Alfdorf (DE)

(72) Inventors: Jürgen Rink, Waldstetten (DE); Markus Daeuber, Eislingen (DE); Adrian Landbeck, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 347 days.

(21) Appl. No.: 16/348,638

(22) PCT Filed: Nov. 10, 2017

(86) PCT No.: PCT/EP2017/078832
§ 371 (c)(1),
(2) Date: May 9, 2019

(87) PCT Pub. No.: WO2018/087266
PCT Pub. Date: May 17, 2018

(65) Prior Publication Data
US 2019/0263353 A1    Aug. 29, 2019

(30) Foreign Application Priority Data
Nov. 11, 2016 (DE) .......................... 102016121609.7

(51) Int. Cl.
*B60R 22/36* (2006.01)
(52) U.S. Cl.
CPC .................................. *B60R 22/36* (2013.01)

(58) Field of Classification Search
CPC ....... B60R 22/36; B60R 22/38; B60R 22/343; B60R 22/3405; B60R 22/3413
See application file for complete search history.

(56) References Cited

U.S. PATENT DOCUMENTS 4,509,707 A * 4/1985 Ernst ........................ B60R 22/36
242/376.1
6,131,843 A 10/2000 Singer et al.
(Continued)

FOREIGN PATENT DOCUMENTS

DE         19927731       12/2000
DE         102009023625    3/2010
WO         2012116770      9/2012

*Primary Examiner* — Sang K Kim
(74) *Attorney, Agent, or Firm* — Tarolli, Sundheim, Covell & Tummino LLP

(57) ABSTRACT

The invention relates to a belt rectractor (10) for a seatbelt of a motor vehicle. The belt retractor (10) comprises a belt spool (14) which is rotationally connected to a belt spool-side end of a torsioning rod, said torsioning rod being operatively connected to a locking mechanism (20) at a locking mechanism-side end. In a locked state, the locking mechanism-side end of the torsioning rod is rotationally fixed to a frame (12). The belt spool-side end can then be rotated relative to the locking mechanism-side end in an unwinding direction (16) under the effect of torsion from the torsioning rod. The belt spool (14) is additionally rotationally fixed to the frame (12) in the unwinding direction (16) in a stopped state of a stopping mechanism (22). The stopped state is set of the belt spool-side end is rotated by a specified number of rotations relative to the locking mechanism-side end in the locked state of the locking mechanism (20). The stopping mechanism (22) comprises a locking pawl which is mounted on the belt spool (14).

35 Claims, 17 Drawing Sheets

(56) References Cited

U.S. PATENT DOCUMENTS

| | | | |
|---|---|---|---|
| 6,416,008 B1 * | 7/2002 | Fujii | B60R 22/4676 242/379.1 |
| 6,481,660 B2 * | 11/2002 | Nagata | B60R 22/3413 242/379.1 |
| 2018/0037192 A1 * | 2/2018 | Yanagawa | B60R 22/4676 |
| 2018/0265033 A1 * | 9/2018 | Jaradi | B60R 22/415 |

* cited by examiner

BELT RETRACTOR

RELATED APPLICATIONS

This application corresponds to PCT/EP2017/078832, filed Nov. 10, 2017, which claims the benefit of German Application No. 10 2016 121 609.7, filed Nov. 11, 2016, the subject matter of which are incorporated herein by reference in their entirety.

BACKGROUND OF THE INVENTION

The invention relates to a belt retractor for a seat belt of a motor vehicle, having a belt reel which is mounted in a frame so as to be rotatable in an unwinding direction and a winding direction, which is in the opposite direction to the unwinding direction, and is non-rotatably connected to a belt-reel-side end of a torsion rod, which is arranged substantially coaxially to the belt reel, wherein the torsion rod is operatively connected by way of a locking-mechanism-side end, which is opposite the belt-reel-side end, to a locking mechanism and, with the locking mechanism in a locked state which is set up in a vehicle-sensitive and/or webbing-sensitive manner, the locking-mechanism-side end of the torsion rod is fixed to the frame so as to be non-rotatable in the unwinding direction, wherein in the locked state, with the torsion rod under torsion, the belt-reel-side end is rotatable in the unwinding direction relative to the locking-mechanism-side end, wherein the belt reel, with a stopping mechanism in a stopped state, is fixed to the frame so as to be non-rotatable in the unwinding direction, and wherein the stopped state is set up when the belt-reel-side end is twisted by a predefined number of revolutions in relation to the locking-mechanism-side end, with the locking mechanism in the locked state.

Such belt retractors are known from the prior art. The torsion rod, in this case, acts as a component part of a belt force limiting mechanism. By means of which belt force limiting mechanism, the force exerted by a seat belt onto a passenger is able to be delimited by the unwinding of a certain length of the webbing of the seat belt being allowed.

Known stopping mechanisms include, for example, a nut which is mounted on the torsion rod via a thread so as to be rotatable and at the same time is connected non-rotatably to the belt reel. If the torsion rod is then twisted, it is rotated relative to the belt reel and relative to the nut. After a predefined number of revolutions, the nut runs up to a locking disk by way of an end face. Further rotation of the nut on the torsion rod is thus blocked. Consequently, further twisting of the torsion rod is also blocked and the belt reel is unable to rotate further in the unwinding direction relative to the frame. The belt reel and the torsion rod now behave as a one-piece axle. Consequently, the webbing of the seat belt is ultimately unable to be unwound any further from the belt reel. The belt force delimitation is at an end.

Such stopping mechanisms are also designated in part in the prior art as counting mechanisms. However, strictly speaking a counting s mechanism only designates the mechanism which determines when the stopped state of the stopping mechanism should be set. A counting mechanism cooperates very closely with a stopping mechanism but is, in principle, different to it. Said strict understanding of counting mechanisms and stopping mechanisms underlies the statements below.

SUMMARY OF THE INVENTION

The object of the invention is the further improvement of belt retractors which include a locking mechanism, a belt force delimiting mechanism and a stopping mechanism. A belt retractor which has compact dimensions is to be created in particular in this case. In addition, such a belt retractor, with the stopping mechanism in the stopped state, should be able to be loaded as evenly as possible and should consequently function reliably and be light in weight.

The object is achieved by a belt retractor of the type named in the introduction where the stopping mechanism includes a pawl which is mounted on the belt reel. In a stopped state, the belt reel is fixed non-rotatably on the frame by means of the pawl. In a released state, the belt reel is rotatable in relation to the frame. The pawl is then disengaged. Such a pawl is able to assume various switching states in a defined manner so that the stopped state and the released state of the stopping mechanism are able to be set in a precise and reliable manner. In addition, a pawl is a relatively small and light component so that the belt retractor is also able to be designed in a small and light manner. In particular, such a belt retractor is able to be realized along a center axis of the belt reel with a short length.

The belt tensioner can also additionally include a gas-powered belt tensioner, by way of which so-called belt pretensioning is able to be carried out.

The belt reel is preferably fixed on a side of the frame opposite the locking mechanism in the stopped state. From the perspective of the torsion rod, the belt reel is therefore fixed by the stopping mechanism at the belt-reel-side end thereof. The locking mechanism cooperates in a known manner with the locking-mechanism-side end of the torsion rod. The belt reel, more precisely the torsion rod connected to the belt reel, is therefore retained at both its ends. The belt retractor and its components are loaded evenly in the stopped state in this manner. Consequently, the belt retractor can be constructed simply and lightly compared to known belt retractors. In particular, it is possible to dispense at least in part with one-sided reinforcement of the belt retractor.

According to an embodiment, in the stopped state the pawl engages in a toothing of an actuating disk of a clutch and the clutch couples the belt reel with the frame so as to be non-rotatable in the unwinding direction, in particular the pawl is spring-loaded in the direction of the toothing. A clutch is described in detail, for example, in U.S. patent application Ser. No. 15/228,056. Such a clutch is designed very compactly in the direction of a rotational axis of the belt reel so that an associated belt retractor only takes up a small amount of installation space. Furthermore, the clutch is able to absorb large forces and is not restricted as to the number of clutch operations, i.e. the clutch is able to be engaged and disengaged an arbitrary number of times. The pawl is always in a defined state as a result of the spring loading. In case of doubt, it connects the clutch so that the belt reel is coupled with the frame. A high level of passenger safety is therefore ensured. Furthermore, the effect of the spring loading of the pawl is that the stopping mechanism and the clutch are able to be controlled quickly and precisely. Unwanted noises, e.g. as a result of rattling, are also avoided.

The clutch can be actuated by one single actuating disk or by multiple actuating disks that are coupled together, that is to say can be transferred into a state in which it connects the belt reel to the frame in a non-rotatable manner.

In one variant, the aforenamed actuating disk is a first actuating disk and, in the stopped state, the first actuating disk is rotated by a predefined first rotational angle in relation to a second actuating disk of the clutch, wherein, in the stopped state, the first actuating disk and the second actuating disk are rotationally coupled in an actuating direction of the clutch. To actuate the clutch, the pawl therefore first of all engages in the toothing of the first actuating disk. The first actuating disk is consequently non-rotatably connected to the belt reel. Said bond produced from belt reel and first actuating disk can then be rotated again by a predefined first rotational angle in relation to the second actuating disk. In this case, the torsion rod is rotated about said angle. The first actuating disk and the second actuating disk are only then rotationally coupled together in an actuating direction of the clutch and the clutch is transferred into its closed state, in which it fixes the belt reel to the frame. The first actuating disk and the second actuating disk can be coupled together, for example, by means of a circumferential groove which extends around in part and an entrainment lug which is arranged therein. The entrainment lug then extends by the predefined first rotational angle in the circumferential groove before it creates the connection, non-rotatable on one side, between the two actuating disks via the groove end. A secondary counting mechanism is consequently integrated in the actuating mechanism of the clutch. The revolutions or rotational angles recorded by the secondary counting mechanism are added to the revolutions or rotational angles recorded by the counting mechanism. A comparatively smaller and compactly designed counting mechanism is therefore able to be used, as a result of which the design of the belt retractor is particularly light and compact.

In the aforenamed variant, with the stopping mechanism in a released state, the first actuating disk and the second actuating disk are rotatable by the predefined first rotational angle relative to one another in the actuating direction of the clutch. This is achieved by means of the above-mentioned entrainment lug which is freely movable inside the circumferential groove. The entrainment lug is preferably arranged at a first end of the circumferential groove in the released state and at an end which is opposite this in the stopped state. The torsional angle of the torsion rod, provided within the framework of the actuation of the clutch, can thus be adjusted with a high degree of precision.

The actuating mechanism of the clutch can also include a total of three actuating disks.

Such an embodiment provides that a third actuating disk of the clutch is interposed between the first actuating disk and the second actuating disk, wherein in the stopped state the third actuating disk is rotated by a predefined second rotational angle in relation to the first actuating disk and in the stopped state the third actuating disk is rotationally coupled with the first actuating disk in an actuating direction of the clutch, and wherein in the stopped state the second actuating disk is rotated by a predefined third rotational angle in relation to the third actuating disk and in the stopped state the second actuating disk is rotationally coupled with the third actuating disk in an actuating direction of the clutch. The coupling of the first actuating disk with the third and the coupling of the third actuating disk with the second is effected analogously to the above-described embodiment, for example by means of circumferential grooves and entrainment lugs. The additional torsional angle of the torsion rod, made possible and recorded by the actuating mechanism of the clutch, can consequently be enlarged further as a result of the additional actuating disk. Consequently, a particularly small and compact counting mechanism is also sufficient to record multiple revolutions or comparatively large torsional angles of the torsion rod.

In a preferred manner, the third actuating disk and the first actuating disk, with the stopping mechanism in a released state, are rotatable by the predefined second rotational angle in relation to one another in the actuating direction of the clutch and the third actuating disk and the second actuating disk, with the stopping mechanism in a released state, are rotatable by the predefined third rotational angle in relation to one another in the actuating direction of the clutch. Analogously to the previously named embodiment, the entrainment lugs, in this case, are arranged in the released state once again in a preferred manner at the assigned first ends of the corresponding circumferential grooves which are opposite the ends of the circumferential grooves at which the entrainment lugs are situated in the stopped state.

With the stopping mechanism in a released state, the pawl is retained in such a manner by a locking pin that it does not engage in the toothing. The locking pin interacts preferably in a positive locking manner with the pawl so that the pawl is retained reliably, i.e. even in the event of strong acceleration, deceleration or vibrations. In addition, a power supply is not necessary for retaining the pawl. The belt retractor is therefore always situated in a defined state. Furthermore, the locking pin does not take up much installation space.

The locking pin is advantageously mounted so as to be displaceable in the belt reel. The locking pin can therefore be displaced from a position in which it retains the pawl, into a position in which it releases the pawl. The same applies in reverse. The locking pin is consequently guided in a defined manner in the belt retractor, as a result of which the function thereof and the function of the belt retractor are ensured overall in a reliable manner.

In this case, in the released state the locking pin can be arranged in a retaining opening of the pawl and in the stopped state it can be arranged outside the retaining opening. The locking pin therefore cooperates with a defined location of the pawl. The locking pin is held securely in the retaining opening even where forces and vibrations act on the belt retractor. The position of the pawl is able to be controlled precisely as a result. Precise control of the stopping mechanism is ensured in this way, as a result of which a high level of safety is ensured for the passenger.

In a design alternative, the belt retractor includes a counting mechanism which is set up for the purpose of removing the locking pin from the retaining opening when the belt-reel-side end is twisted by the predefined number of revolutions in relation to the locking-mechanism-side end. Consequently, the torsion of the torsion rod and consequently the functionality of the belt force limiting means is precisely defined. The belt force limitation comes to an end after a fixed number of revolutions, that is to say before there is a risk of the torsion rod failing or too long a length of webbing of the seat belt unwinding from the belt reel. The number of revolutions about which the torsion rod is twisted before the locking pin is removed from the retaining opening and the stopped state is thus set, can be chosen, in principle, in an arbitrary manner. It can include a fraction of a full revolution but also more than one revolution. As an alternative to the number of revolutions, a rotational angle which can also be greater than 360° can be specified. A reliable belt force limitation is thus ensured by means of which a high level of safety for the passenger of a motor vehicle is provided, that is to say the user of the belt retractor.

In one embodiment, the counting mechanism can include a thread and a winding disk which is arranged substantially coaxially to the torsion rod, wherein the thread is connected to the locking pin at one end and to the winding disk at another end. The thread, in this case, can also be a cable, a cord, a wire or similar. A simple and reliable mechanism is thus provided, by means of which the locking pin is able to release the pawl. Furthermore, the thread and the winding disk are very light and they only require a small amount of installation space.

The winding disk, in this case, is coupled in a preferred manner non-rotatably with the locking-mechanism-side end of the torsion rod, in particular the winding disk is arranged on a locking disk of the locking mechanism. The winding disk is therefore rotated with the locking-mechanism-side end of the torsion rod and in particular with the locking disk. Once the locking pin does not rotate in relation to the belt-reel-side end of the torsion rod, a rotation of the winding disk relative to the locking pin takes place with the torsion rod being twisted, as a result of which the thread is wound onto the winding disk. Said mechanism is simple and very reliable. In a preferred manner, the winding disk is produced integrally with the locking disk. A saving in production efforts and costs is made as a result.

The thread can include a thread reserve which is arranged, in the released state, between the locking pin and the winding disk. In a preferred manner, in this case, the size of the thread reserve is such that the thread is not tensioned in the released state. The locking pin consequently holds the pawl securely without any force being exerted by the thread on the locking pin. The released state is therefore retained in a reliable manner and is not influenced by the counting mechanism even in the case of vibrations or similar.

In a preferred manner, the thread reserve is wound on the winding disk in the stopped state and the size of a free length of the free thread is such that the locking pin is removed from the retaining opening. The winding of the thread onto the winding disk take place during the twisting of the torsion rod and occurs without any notable resistance and is practically noiseless. As soon as a sufficient length of thread is wound on the winding disk, the locking pin is pulled out of the retaining opening. The stopped state is therefore reliably set. Possible sagging of the torsion rod during the torsion thereof is insignificant to the method of operation of the counting mechanism in this case so that a high level of functional reliability of the belt retractor is provided.

In addition, a length of the thread reserve can be matched to the predefined number of revolutions. The length of the thread between the winding disk and the locking pin is therefore chosen to be precisely of such a length that after the predefined number of revolutions the thread is tensioned between the winding disk and the locking pin and the locking pin is removed from the retaining opening. The predefined number of revolutions is able to be precisely adjusted and/or varied in a simple and cost-efficient manner by means of the length of the thread.

In one variant the thread is arranged in a housing which is connected non-rotatably to the belt reel. The thread is consequently protected against environmental influences and against catching on other elements of the belt retractor. In the stopped state the locking pin is also preferably situated at least in part in the housing. The belt retractor has a high level of reliability and a long service life in this way.

In an alternative embodiment the counting mechanism includes a latching continuation which is arranged on the locking pin, a latching element and an actuating disk which is arranged substantially coaxially to the torsion rod, wherein the latching element is arranged so as to be functional between the latching continuation and the actuating disk. The locking pin is therefore held by the latching element at its latching continuation and is controlled by the actuating disk. The latching continuation, the latching element and the actuating disk are produced, for example, from plastics material. Such a mechanism is simple in design and reliable in operation. Furthermore, a light overall weight of the belt retractor can be ensured in this manner.

In this case, the actuating disk can be coupled non-rotatably with the locking-mechanism-side end of the torsion rod, in particular the actuating disk is arranged on a locking disk of the locking mechanism. The actuating disk is therefore rotated with the locking-mechanism-side end of the torsion rod and in particular with the locking disk. Once the locking pin, the latching continuation and the latching element do not rotate in relation to the belt-reel-side end of the torsion rod, a rotation of the actuating disk relative to the aforenamed elements occurs when the torsion rod is twisted. Consequently, the latching element and the locking pin are positively controlled by means of the actuating disk in dependence on a rotational position of the locking-mechanism-side end of the torsion rod relative to its belt-reel-side end. Said mechanism is simple and very reliable. In a preferred manner, the actuating disk is produced integrally with the locking disk. A saving in production efforts and costs is made as a result.

According to a design alternative, the latching element engages by way of a latching-continuation-side end in a latching toothing which is arranged on the latching continuation, in particular the latching-continuation-side end is realized as a resilient latching arm. The latching continuation, and consequently the locking pin, are therefore retained by the latching element by means of the latching toothing. This prevents unwanted movement of the locking pin. The resilient latching arm is pre-stressed in particular in the direction of the latching toothing, as a result of which it retains the latching continuation securely. As a result, the latching continuation, and consequently the locking pin, is retained securely in its position, irrespective of possible environmental influences, e.g. vibrations. The counting mechanism and the stopping mechanism consequently operate in a reliable manner.

The latching toothing can be designed in such a manner that the latching element is displaceable in a direction of extraction of the locking pin relative to the latching continuation only under entrainment of the latching continuation and in a direction opposite to the direction of extraction by traveling over part of the latching toothing. Under entrainment of the latching continuation means, in this case, that no relative movement takes place between the latching continuation and the latching element. By means of the latching continuation, the locking pin can consequently either be retained in its position by the latching element or displaced in a defined manner in the direction of extraction. With sufficient displacement, the locking pin is removed from the retaining opening and the stopping mechanism is transferred into the stopped state. Displacement of the locking pin in the direction opposite to the direction of extraction by the latching element is not possible. The displacement of the latching element is controlled by the actuating disk. The locking pin is therefore controlled in a positive and reliable manner.

In an advantageous manner, in the stopped state, the latching continuation is displaced so far in the direction of the direction of extraction that the locking pin is removed from the retaining opening. The locking pin then releases the pawl in a controlled manner so that the stopped state of the stopping mechanism is set. A high level of safety for the passenger is consequently ensured.

In a design variant, in the released state the latching continuation is not displaced or is not displaced to a maximum extent in the direction of the direction of extraction that the locking pin is arranged in the retaining opening. The locking pin therefore continues to secure the pawl and the stopping mechanism is in the released state. The locking pin, in this case, is retained by the latching element and the actuating disk by means of its latching continuation. The released state is therefore set in a stable manner.

The latching element can abut against an actuating contour of the actuating disk by way of an actuating-disk-side end, in particular the latching element can be spring-loaded in the direction of the actuating disk. The actuating contour controls the movement of the latching element, i.e. it displaces the latching element in a controlled manner in the opposite direction to the direction of extraction of the locking pin and in a controlled manner allows the latching element to spring back in the direction of extraction of the locking pin. The latching element, in this case, interacts with the latching continuation in the above-described manner. The counting mechanism is therefore controlled overall by the actuating disk. Precise control is ensured as a result of the spring loading.

In a preferred manner, the actuating contour is realized in such a manner that the latching element is displaceable relative to the latching continuation by means of the actuating contour. As a result, the interaction between the latching element and the latching continuation described further above is controlled in dependence on the rotational position of the actuating contour. This is simple and reliable.

In addition, the actuating contour can be matched to the predefined number of revolutions. The actuating contour is formed then in such a manner that, after the predefined number of revolutions, the latching continuation, and consequently the locking pin, is removed from the retaining opening and the stopping mechanism is in the stopped state. The stopping mechanism can thus be controlled in a simple and reliable manner in dependence on the predefined number of revolutions. The belt force limitation comes to an end reliably as a result.

In a design alternative, the latching continuation and the latching element are arranged in a housing which is immovable relative to the belt reel, in particular the latching continuation and the latching element extend substantially parallel. The latching continuation and the latching element are consequently protected against environmental influences. In the stopped state, the locking pin is also preferably situated at least in part in the housing. The belt retractor has a high level of reliability and a long service life in this way. As a result of the parallel arrangement of latching continuation and latching element, only a small installation space is additionally taken up.

In an alternative embodiment, the counting mechanism includes a locking pin continuation which is arranged on an end of the locking pin remote from the pawl, a contact surface and a cutting disk, wherein the locking pin continuation abuts against the contact surface. The locking pin is therefore retained in its position by the contact surface. Movement of the locking pin is controlled by the cutting disk. The locking pin continuation and the contact surface are produced in a preferred manner from plastics material, the cutting disk is produced at least in part from metal. Such a mechanism is simple in design and reliable in operation. Furthermore, a low overall weight and a small installation space requirement can be ensured in this way.

The contact surface and the cutting disk can be coupled non-rotatably with the locking-mechanism-side end of the torsion rod, in particular the contact surface and the cutting disk are arranged on a locking disk of the locking mechanism. The contact surface and the cutting disk therefore rotate with the locking-mechanism-side end of the torsion rod and in particular with the locking disk. Once the locking pin and the locking pin continuation do not rotate in relation to the belt-reel-side end of the torsion rod, the cutting disk rotates relative to the aforementioned elements when the torsion rod is twisted. Consequently, by means of the cutting disk, the locking pin continuation, and consequently the locking pin, is controlled positively in dependence on a rotational position of the locking-mechanism-side end of the torsion rod relative to its belt-reel-side end. Said mechanism is simple and reliable. In a preferred manner, the cutting disk is produced integrally with the locking disk. A saving in production efforts and costs is made as a result.

In one embodiment, the cutting disk is at a spacing from the contact surface in a direction of extension of the locking pin continuation. The cutting disk, in this case, is positioned closer to the locking pin than the contact surface. The locking pin continuation can therefore be subdivided into two portions. A first portion extends between the locking pin and the cutting disk and a second portion extends between the cutting disk and the contact surface. Consequently, it is always ensured that the cutting disk is able to interact with the locking pin continuation and is thus always able to control the locking pin continuation.

The locking pin continuation can be spring-loaded in the direction of the contact surface. As a result, the locking pin continuation always abuts against the contact surface. The counting mechanism consequently functions in a very reliable manner.

In one variant, the cutting disk is realized for the purpose of severing a segment from the locking pin continuation when the locking pin is moved relative to the cutting disk. The cutting disk then severs the portion of the locking pin continuation which extends between the cutting disk and the contact surface from the remainder of the same. The cutting disk is realized with sharp edges for this purpose. Once said segment has been severed, the locking pin continuation, and consequently the locking pin, is displaced by the length of the severed segment in the direction of the contact surface. The locking pin is moved, in this case, at least in part out of the retaining opening. After the displacement, the former cutting surface abuts against the contact surface. A simple mechanism for controlling the locking pin in dependence on twisting the torsion rod is consequently provided.

The segment can be defined in the locking pin continuation by a notch, wherein the separation is preferably effected in the region of the notch. Multiple notches can also be present so that multiple segments can be defined. The cutting disk preferably carries out the separation of the segments in the region of the notch. At said points it is a reduced material thickness of the locking pin continuation that has to be severed so that a lower separating force needs to be applied by the cutting disk. A segment width, that is to say the distance between a contact-surface-side end of the locking pin continuation and an adjacent notch and/or the distance between two adjacent notches, preferably corresponds, in this case, to the distance between the contact surface and the cutting disk. Low-resistance and low-noise separation of segments can be ensured in this way.

One or multiple segments is or are preferably severed in the stopped state so that the locking pin is removed from the retaining opening. The locking pin continuation, in this case, is shortened by so many segments that when the contact-surface-side end of the locking pin continuation abuts against the contact surface, the locking pin is no longer able to be situated in the retaining opening. The locking pin then releases the pawl in a controlled manner so that the stopped state of the stopping mechanism is set. A high level of passenger safety is consequently ensured.

In addition, no segments or so few segments can be severed in the released state that the locking pin is arranged in the retaining opening. The contact-surface-side end of the locking pin continuation always abuts, in this case, against the contact surface. The locking pin continues to secure the pawl and the stopping mechanism is in the released state.

In one embodiment, the counting mechanism includes a triggering disk which is arranged substantially coaxially to the torsion rod and is connected non-rotatably to the locking-mechanism-side end of the torsion rod, wherein the triggering disk comprises a retaining surface, which extends substantially around the torsion rod and against which, with the stopping mechanism in the released state, abuts against an end of the locking pin which is remote from the pawl, and wherein the triggering disk includes an indentation which interrupts the retaining surface and in which the end of the locking pin remote from the pawl engages in the stopped state. The retaining surface and the indentation are preferably supplemented to form a ring which extends fully around the torsion rod. The pawl-side end of the locking pin is therefore retained inside the retaining opening as a result of the end of the locking pin remote from the pawl abutting against the retaining surface. The indentation, in this case, is designed such that the pawl-side end of the locking pin is removed or slips out from the retaining opening when the end of locking pin remote from the pawl engages in the indentation. Reliable release of the pawl and consequently smooth functioning of the counting mechanism is consequently ensured.

In one variant, the retaining surface extends around the torsion rod substantially by between 290° and 310°, in particular by between 298° and 302°, and/or the indentation extends around the torsion rod substantially by between 50° and 70°, in particular by between 58° and 62°. In a particularly preferred embodiment, the retaining surface extends around by 301° and the indentation extends around by 59°. By fixing the rotational angle assigned to the retaining surface, it is possible to define the rotational angle or torsional angle of the belt-reel-side end of the torsion rod in relation to the locking-mechanism-side end of the torsion rod at which the belt force limitation ends and the belt-reel-side is to be fixed to the frame. The torsional angle corresponds, in this case, substantially to the rotational angle of the retaining surface.

The locking pin is preferably pre-stressed in the direction of the triggering disk, in particular is pre-stressed by means of a spring. This consequently ensures that the locking pin abuts reliably against the retaining surface and consequently also engages reliably in the indentation as soon as the torsion rod is twisted by the predefined torsional angle. The counting mechanism functions securely and reliably as a result.

In an alternative, the locking pin extends substantially parallel to the torsion rod and is mounted on the belt reel. Consequently, the locking pin rotates together with the belt-reel-side end of the torsion rod. The end of the locking pin remote from the pawl slides, in this case, within the released state in the circumferential direction on the retaining surface.

BRIEF DESCRIPTION OF THE DRAWINGS

The invention is explained below by way of various exemplary embodiments which are shown in the accompanying drawings, in which.

DESCRIPTION

Figure 1:
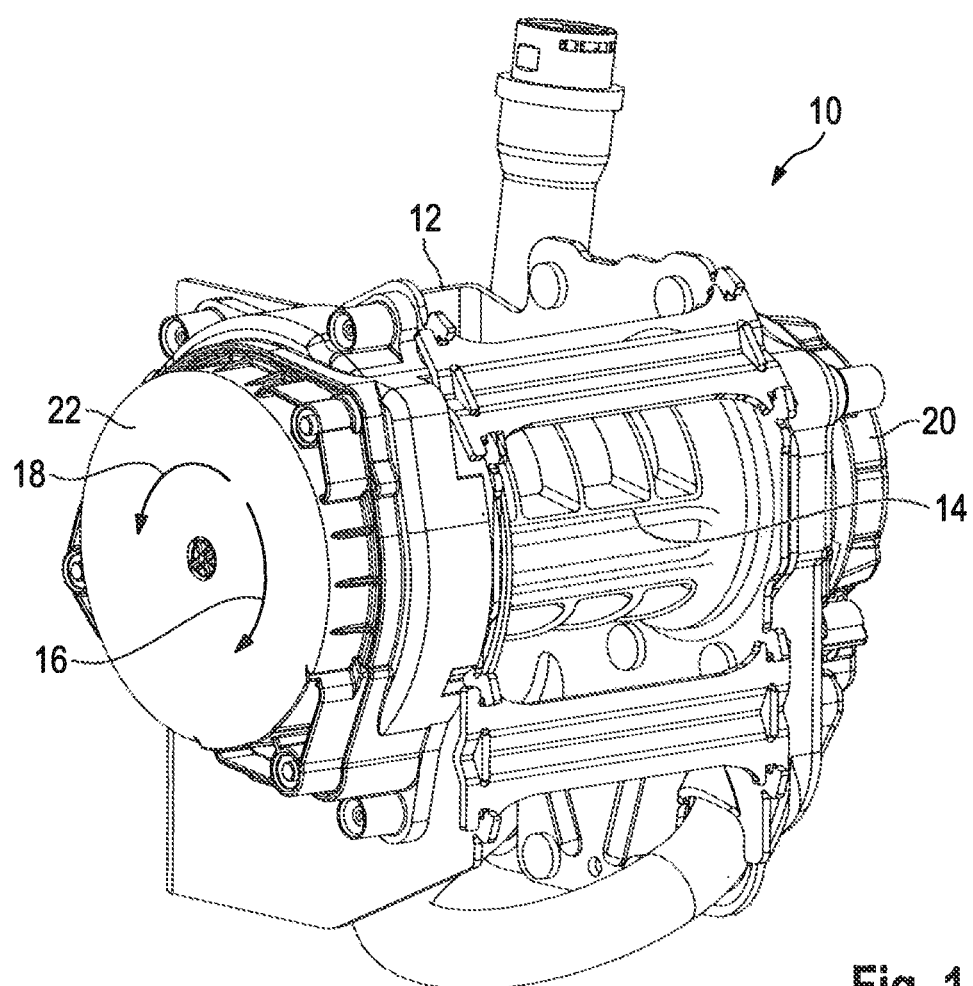
FIG. 1 shows a perspective view of a belt retractor according to the invention.

FIG. 1 shows a belt retractor 10 having a belt reel 14 which is mounted so as to be rotatable in a frame 12. The belt reel 14, in this case, can be rotated in the frame 12 in an unwinding direction 16 and a winding direction 18, which is in the opposite direction to the unwinding direction 16. Webbing is not shown for reasons of clarity.

Figure 5:
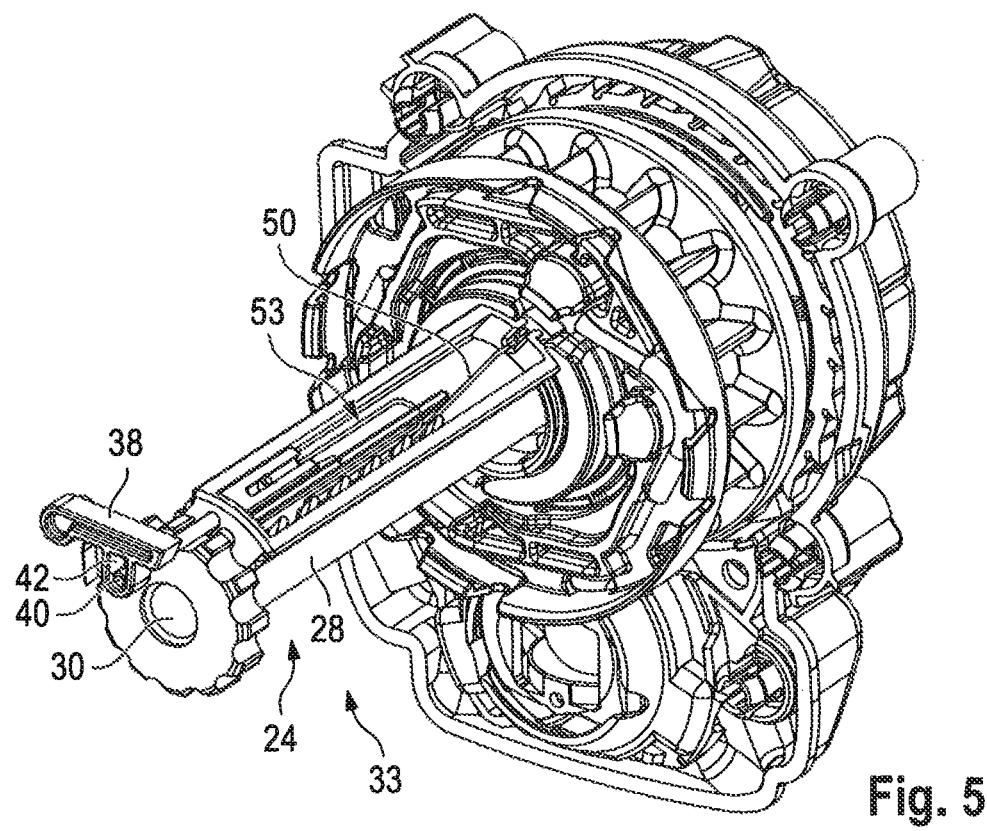
FIG. 5 shows a belt retractor according to the invention according to a first embodiment based on a thread.
Figure 6:
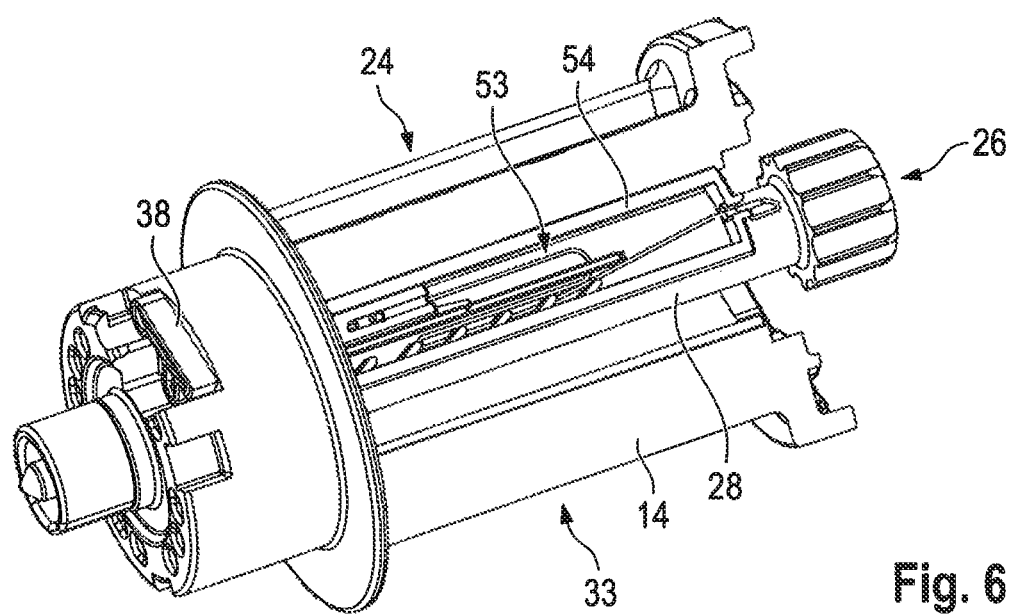
FIG. 6 shows a belt reel assembly of a belt retractor according to the invention according to the first embodiment.
Figure 7:
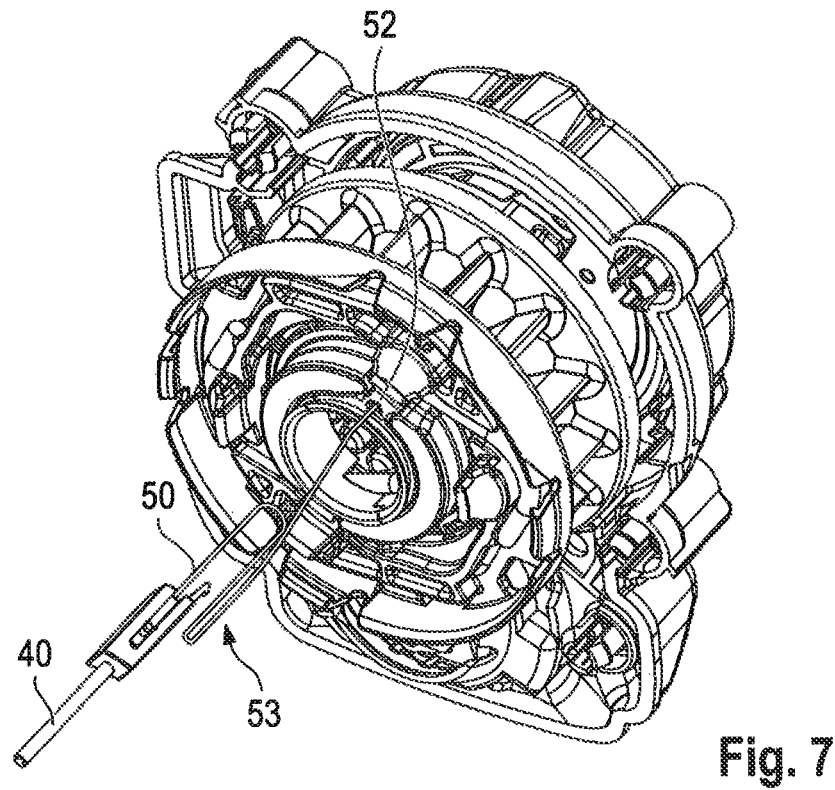
FIG. 7 shows a detail of a counting mechanism of a belt retractor according to the invention according to the first embodiment.
Figure 8:
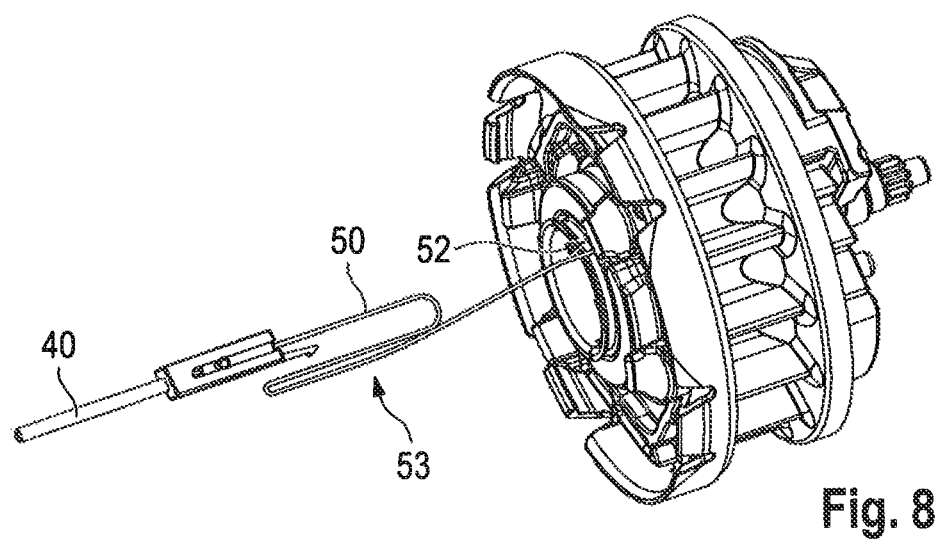
FIG. 8 shows a further detail of a counting mechanism of a belt retractor according to the invention according to the first embodiment.
Figure 9:
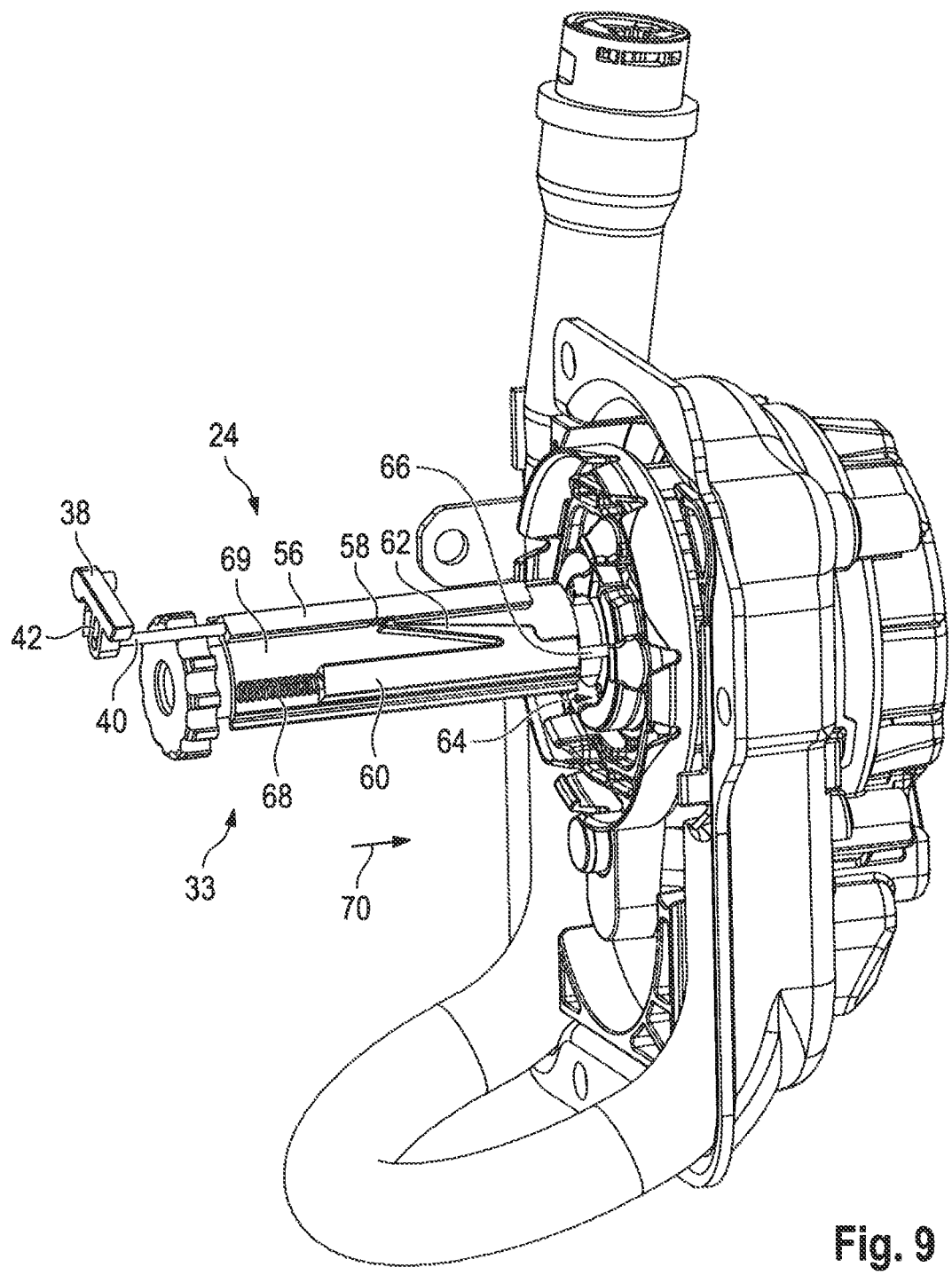
FIG. 9 shows a belt retractor according to the invention according to a second embodiment based on a latching principle.
Figure 10:
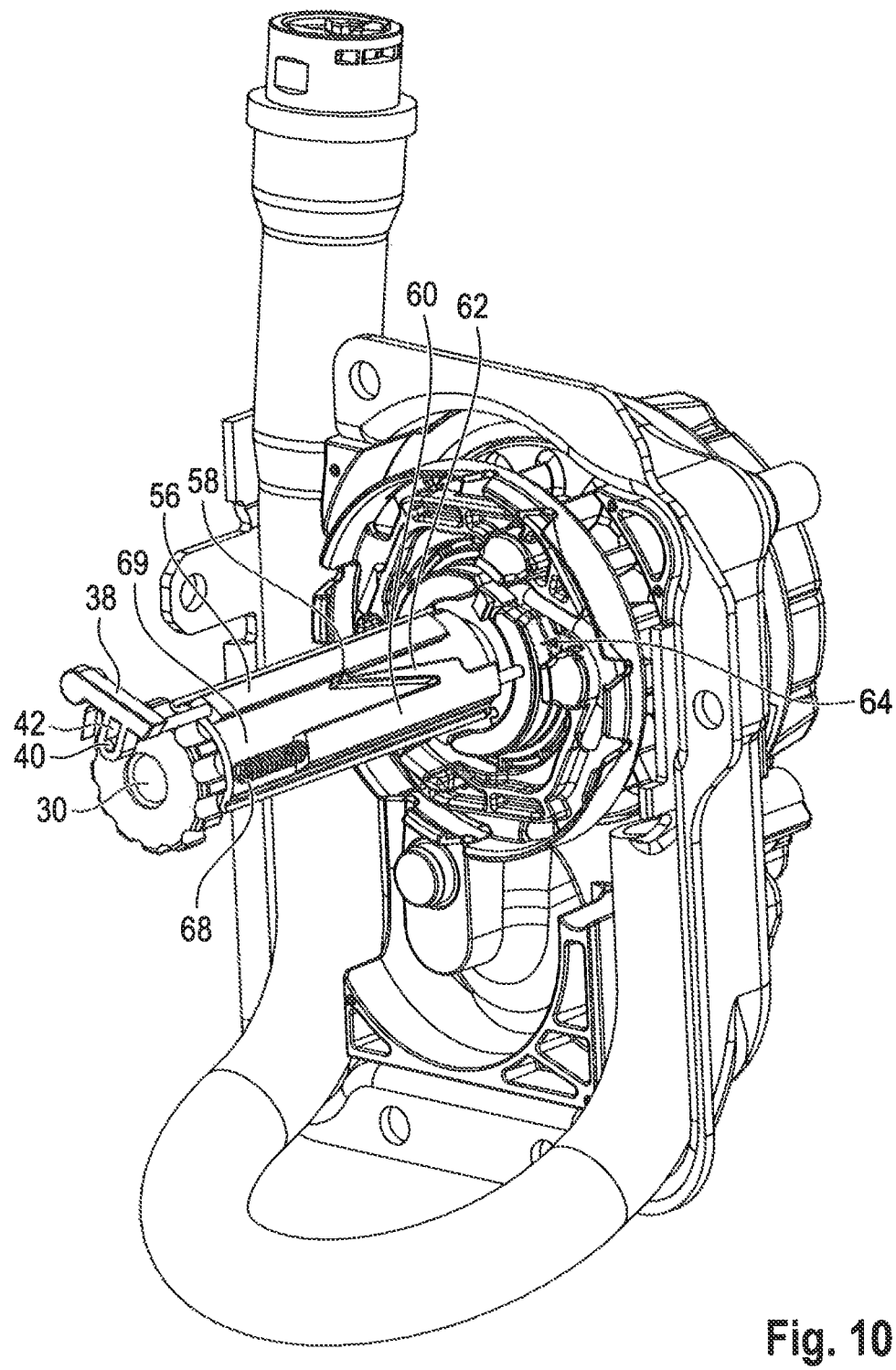
FIG. 10 shows a further view of a belt retractor according to the invention according to the second embodiment.
Figure 11:
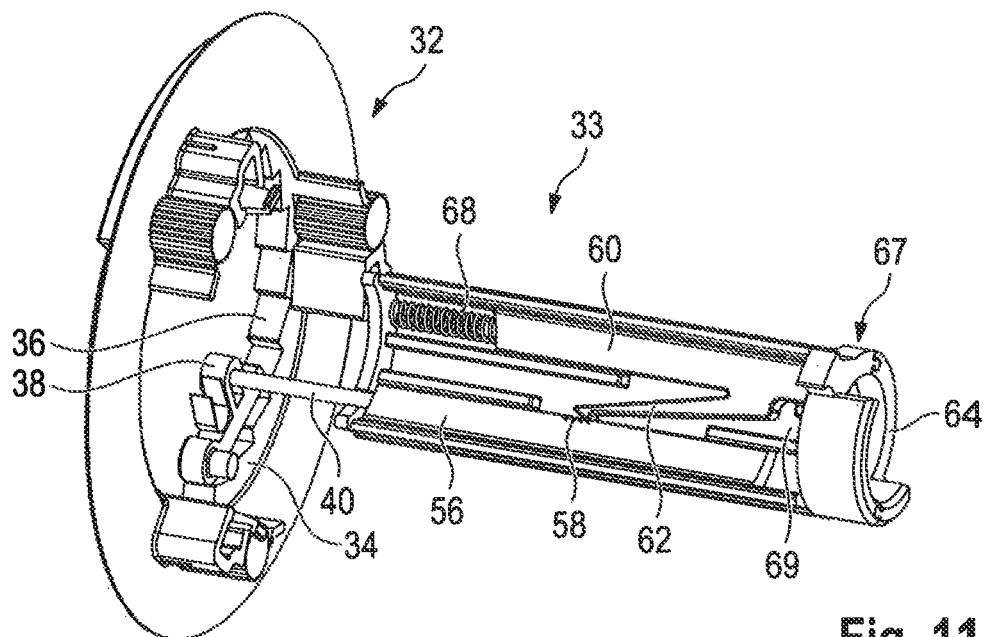
FIG. 11 shows a view of a detail of a belt retractor according to the invention according to the second embodiment.

The belt retractor 10 includes furthermore a locking mechanism 20, a stopping mechanism 22 and a belt force limiting mechanism 24 (see for example FIGS. 5 and 6).

In this case, the locking mechanism 20 and the stopping mechanism 22 are arranged on opposite sides of the belt reel 14.

The locking mechanism 20, which is not shown in detail, serves for the purpose of setting up a locked state in a webbing-sensitive and/or vehicle-sensitive manner and thus of blocking a rotational movement of the belt reel 14 relative to the frame 12 in the unwinding direction 16.

In the locked state, a locking-mechanism-side end 26 of a torsion rod 28 is fixed non-rotatably in the unwinding direction 16 on the frame 12 for this purpose. This is effected on the side of the frame 12 on which the locking mechanism 20 is arranged. The torsion rod 28 is therefore operatively connected to the locking mechanism 20.

The belt force limiting mechanism 24, which limits the force acting on the passenger, then acts in the locked state. This occurs as a result of the torsion rod 28 being twisted. A belt-reel-side end 30 of the torsion rod 28, which is always non-rotatably connected to the belt reel 14, is rotated relative to the locking-mechanism-side end 26 for this purpose.

The stopping mechanism 22 is set up for the purpose of fixing the belt reel 14 on the frame 12 by means of a clutch 32, the clutch 32 fixing the belt reel 14 on the side of the frame 12 on which the stopping mechanism 22 is arranged.

The stopping mechanism 22 is then in a stopped state. This is always set up when the belt-reel-side end 30 is twisted by a predefined number of revolutions in relation to the locking-mechanism-side end 26 and the locking mechanism 20 is situated in the locked stated.

A counting mechanism 33, in this case, records whether the predefined number of revolutions has been reached. The counting mechanism 33 also sets up the stopped state of the stopping mechanism 22.

Figure 2:
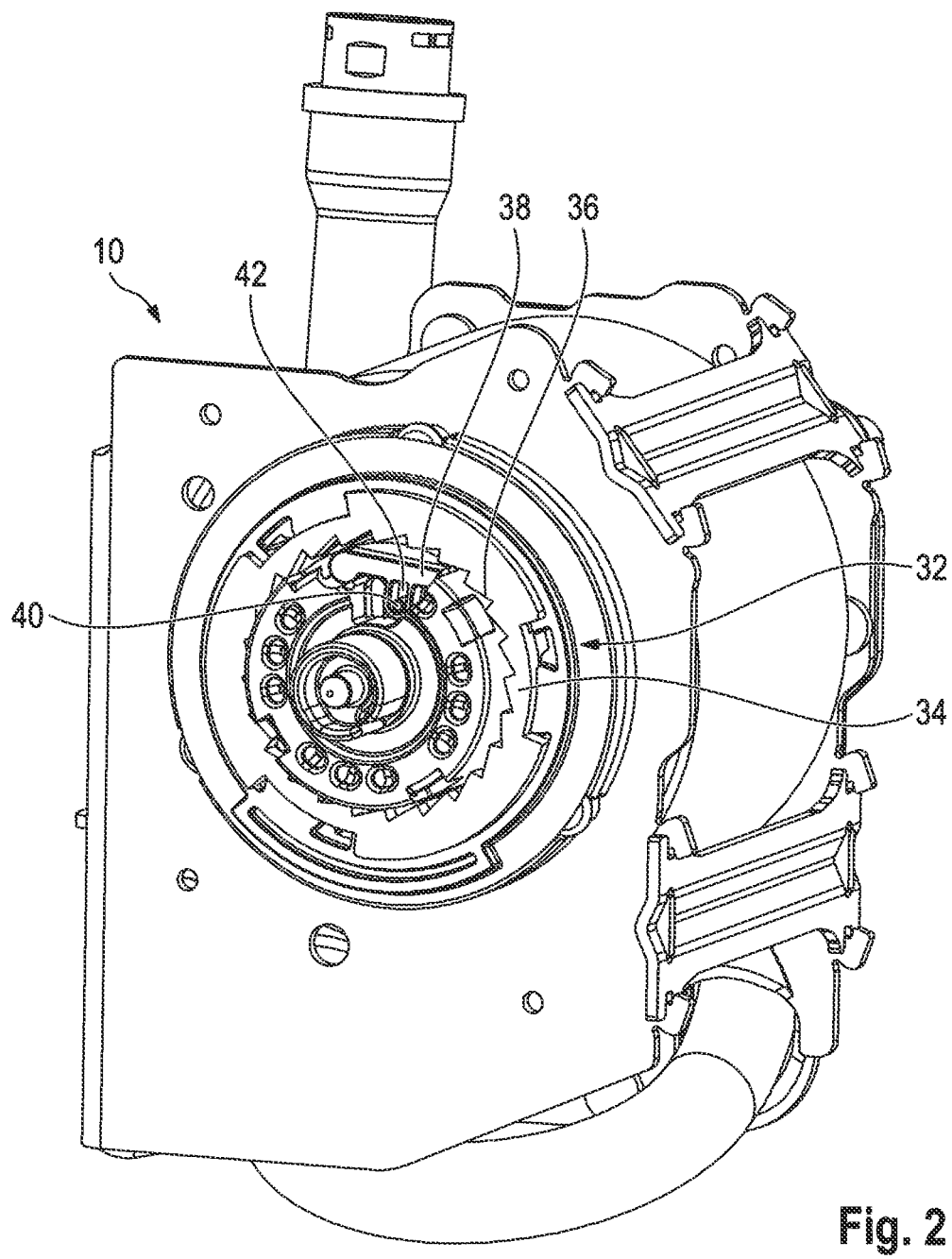
FIG. 2 shows a further perspective view of the belt retractor according to the invention from FIG. 1, a housing part having been removed.

A housing part, which covers the stopping mechanism 22, has been left out from FIG. 2 so that an actuating disk 34 of the clutch 32 is visible. A toothing 36, which interacts with a pawl 38 of the stopping mechanism 22, is arranged in the actuating disk 34.

The pawl, in this case, is pivotably mounted on the belt reel 14.

Figure 4:
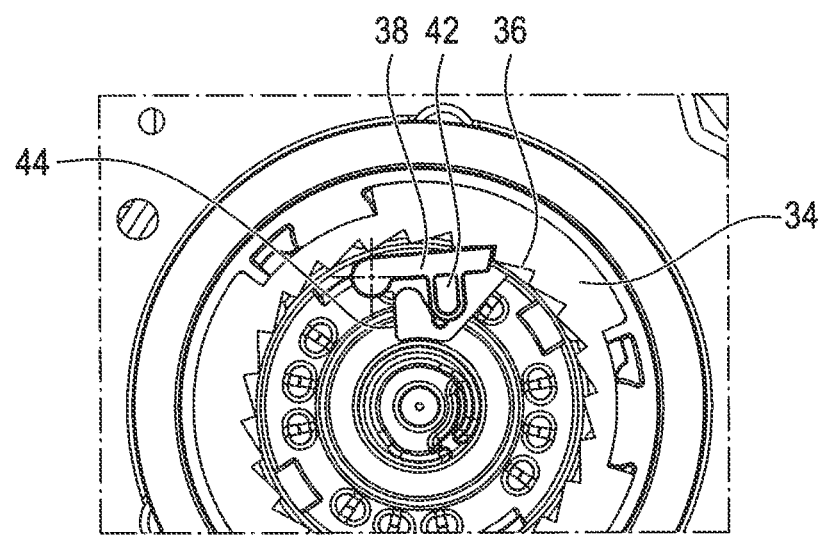
FIG. 4 shows the detail of a stopping mechanism of a belt retractor according to the invention from FIG. 3 but in the stopped state.

With the stopping mechanism 22 in a stopped state (see FIG. 4), the pawl 38 engages in the toothing 36 of the actuating disk 34. The actuating disk 34 is then entrained via the pawl 38 and rotated in such a manner that the clutch 32 is closed and the belt reel 14 is fixed on the frame 12. This is effected such that the belt reel 14 is at least no longer able to rotate in the unwinding direction 16 in relation to the frame 12.

Figure 3:
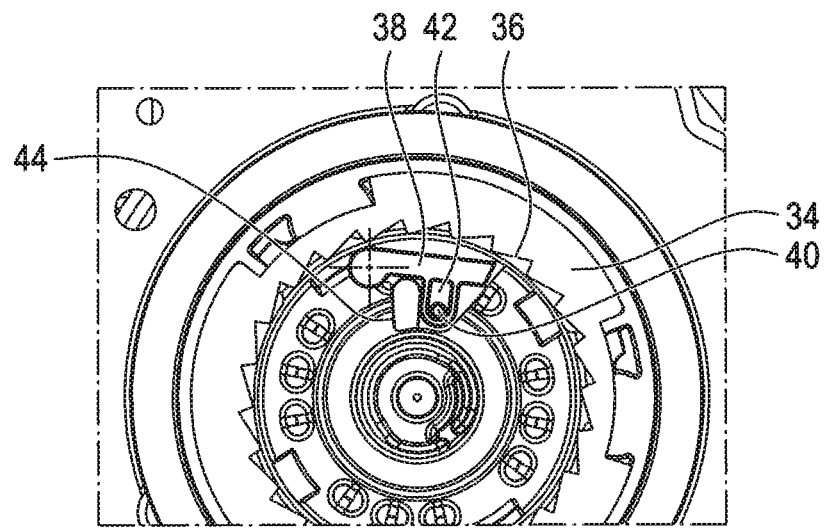
FIG. 3 shows a detail of a stopping mechanism of a belt retractor according to the invention in the released state.

With the stopping mechanism 22 in a released state (see FIG. 3), the pawl 38 does not engage in the toothing 36. The clutch 32 consequently remains open and the belt reel 14 is able to rotate freely in the frame 12, at least as regards the stopping mechanism 22.

In the released state, the pawl 38 is retained by a locking pin 40, which is arranged in a retaining opening 42 of the pawl 38. The locking pin 40, in this case, is mounted so as to be displaceable in the belt reel 14.

The locking pin 40 is removed from the retaining opening 42 in the stopped state.

The pawl 38, in this case, is acted upon by a spring 44 in the direction of the toothing 36 of the actuating disk 34. This means that the pawl 38 is pretensioned in the direction of the locked state.

The stopped state is set up when the belt-reel-side end 30 is rotated by a predefined number of revolutions in relation to the blocking-mechanism-side end 26 with the blocking mechanism 20 in the blocked state. The torsion rod 28 is the twisted by the predefined number of revolutions.

The counting mechanism 33 is explained below by way of various embodiments. The counting mechanism 33 is set up for the purpose of removing the locking pin 40 from the retaining opening 42 when the predefined number of revolutions has been reached.

In a first embodiment of the belt retractor 10 shown in FIGS. 5-8, the counting mechanism 33 is based on a thread 50.

The thread 50 is connected to the locking pin 40 at one end. The thread 50 is connected to a winding disk 52 at its other end.

The winding disk 52, in this case, is connected non-rotatably to the locking-mechanism-side end 26 of the torsion rod 28. It is additionally arranged substantially coaxially to the torsion rod 28.

The winding disk 52 can be arranged furthermore on a locking disk (not shown in any detail) of the locking mechanism 20.

The released state of the stopping mechanism 22 is shown in FIGS. 5-8. This means that the thread 50 includes a thread reserve 53 which is arranged between the winding disk 52 and the locking pin 40 but is not tensioned.

With the stopping mechanism 22 in a stopped state (not shown in any detail), the thread reserve 53 is so small that the thread 50 is tensioned between the winding disk 52 and the locking pin 40 and the locking pin 40 is removed from the retaining opening 42 by means of the thread 50.

The thread can be arranged, in this case, in a housing 54 which is connected non-rotatably to the belt reel 14. The locking pin 40 is also situated at least in part in the housing 54 in the stopped state.

The stopping mechanism 22 and the counting mechanism 33 of the first embodiment of the belt retractor 10 function as follows.

In a released state, the locking pin 40 is situated initially in the retaining opening 42 of the pawl 38. The thread reserve 53 of the thread 50 rests loosely inside the housing 54.

If the locked state of the locking mechanism 20 is then set up, that is to say the locking-mechanism-side end 26 of the torsion rod 28 is fixed to the frame 12, the belt reel 14 is only able to be rotated in the unwinding direction 16 within the framework of the belt force limitation still with the torsion rod 28 under torsion.

In the case of said rotation, the thread 50 is wound onto the winding disk 52 as the winding disk 52 is also rotated relative to the locking pin 40 and consequently the two ends of the thread 50 are rotated relative to one another.

The length of the thread reserve 53, that is to say also the length of the thread 50 overall, is matched in this case such that at a predefined number of revolutions, the thread 50 is tensioned between the winding disk 52 and the locking pin 40 and the thread 50 pulls the locking pin 40 out of the retaining opening 42. The locking pin 40 then rests at least in part inside the housing 54.

The pawl 38 then engages in the toothing 36 and the stopping mechanism 22 is in the stopped state.

A second embodiment of the belt retractor 10 is shown in FIGS. 9-12

In this embodiment the counting mechanism 33 differs from that of the first embodiment.

The counting mechanism 33 here includes a latching continuation 56 which is realized on the locking pin 40 and is produced in one piece with the locking pin 40.

A latching toothing 58, via which the latching continuation 56 interacts with a latching element 60, is arranged on the latching continuation 56. The latching element 60 includes a latching-continuation-side end 62, which can be a resilient latching arm, for this purpose.

Furthermore, the latching element 60 interacts with an actuating disk 64. An actuating-disk-side end 66 is provided on the latching element 60 for this purpose.

The latching element 60 is pretensioned in the direction of the actuating disk 64 by means of a spring 68 so that the latching element 60, more precisely the actuating-disk-side end 66, always abuts against an actuating contour 67 of the actuating disk 64.

The actuating disk 64 is coupled non-rotatably with the locking-mechanism-side end 26 of the torsion rod 28 and is arranged coaxially thereto. In this case, the actuating disk 64 can be arranged in particular on a locking disk of the locking mechanism 20.

The latching continuation 56, the latching element 60 and the spring 68 are preferably arranged in a housing 69 which is mounted non-rotatably on the belt reel 14.

The latching element 60 and the latching continuation 56 extend substantially parallel inside the housing.

The method of operation of the second embodiment is as follows.

Proceeding with the stopping mechanism 22 in a released state, in which the locking pin 40 is arranged at least in part in the retaining opening 42 of the pawl 38, the locking mechanism 20 is moved in a locked state.

The locking-mechanism-side end 26 of the torsion rod 28 is therefore fixed in the frame 12 of the belt retractor 10.

If, within the framework of the belt force limitation, the belt-reel-side end 30 of the torsion rod 28 is rotated in relation to the locking-mechanism-side end 26, the latching continuation 56 and the latching element 60 are rotated relative to the actuating disk 64 and the actuating contour 67.

On account of the spring loading provided by the spring 68, the actuating-disk-side end 66 of the latching element 60 always abuts, in this case, against the actuating contour 67 of the actuating disk 64.

In dependence on the actuating contour 67, the latching element 60 can then be displaced relative to the latching continuation 56 in opposition to a direction of extraction 70 of the locking pin 40. The latching toothing 58 and the latching-continuation-side end 62 interact, in this case, in such a manner that the latching toothing 58 is traveled over by the latching-continuation-side end 62, i.e. the latching element 60 is moved 70 relative to the latching continuation 56 in opposition to the direction of extraction without moving said latching continuation.

The latching element 60, however, always entrains the latching continuation 56 in the direction of extraction 70, i.e. there is no relative movement between the latching element 60 and the latching continuation 56 in the direction of extraction 70.

The latching continuation 56, and consequently the locking pin 40, is therefore moved in a controlled manner in the direction of extraction 70 in dependence on the position of the actuating contour 67 of the actuating disk 64.

Figure 12:
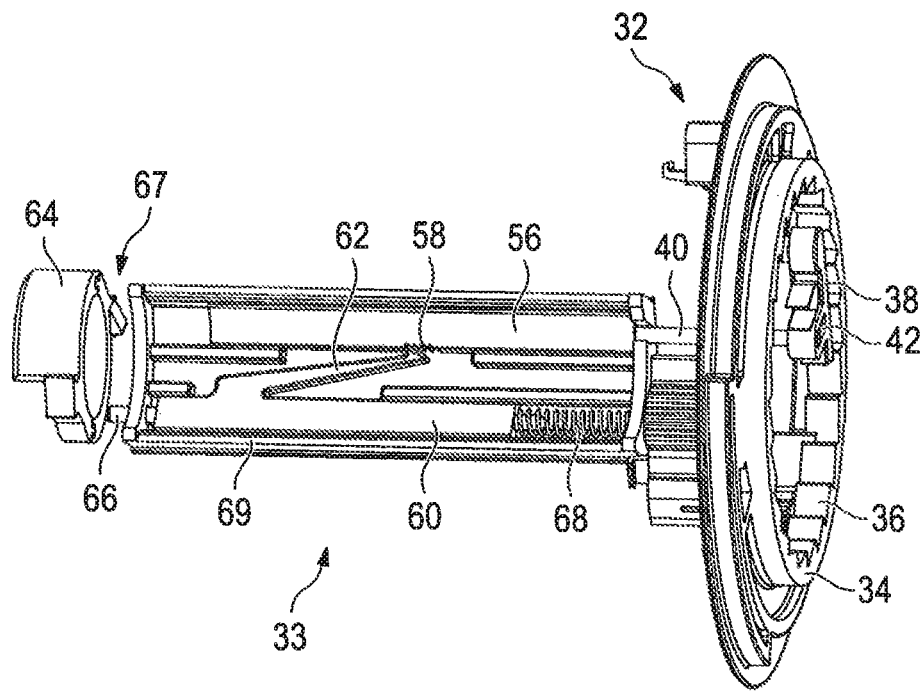
FIG. 12 shows a further view of a detail of a belt retractor according to the invention according to the second embodiment.
Figure 13:
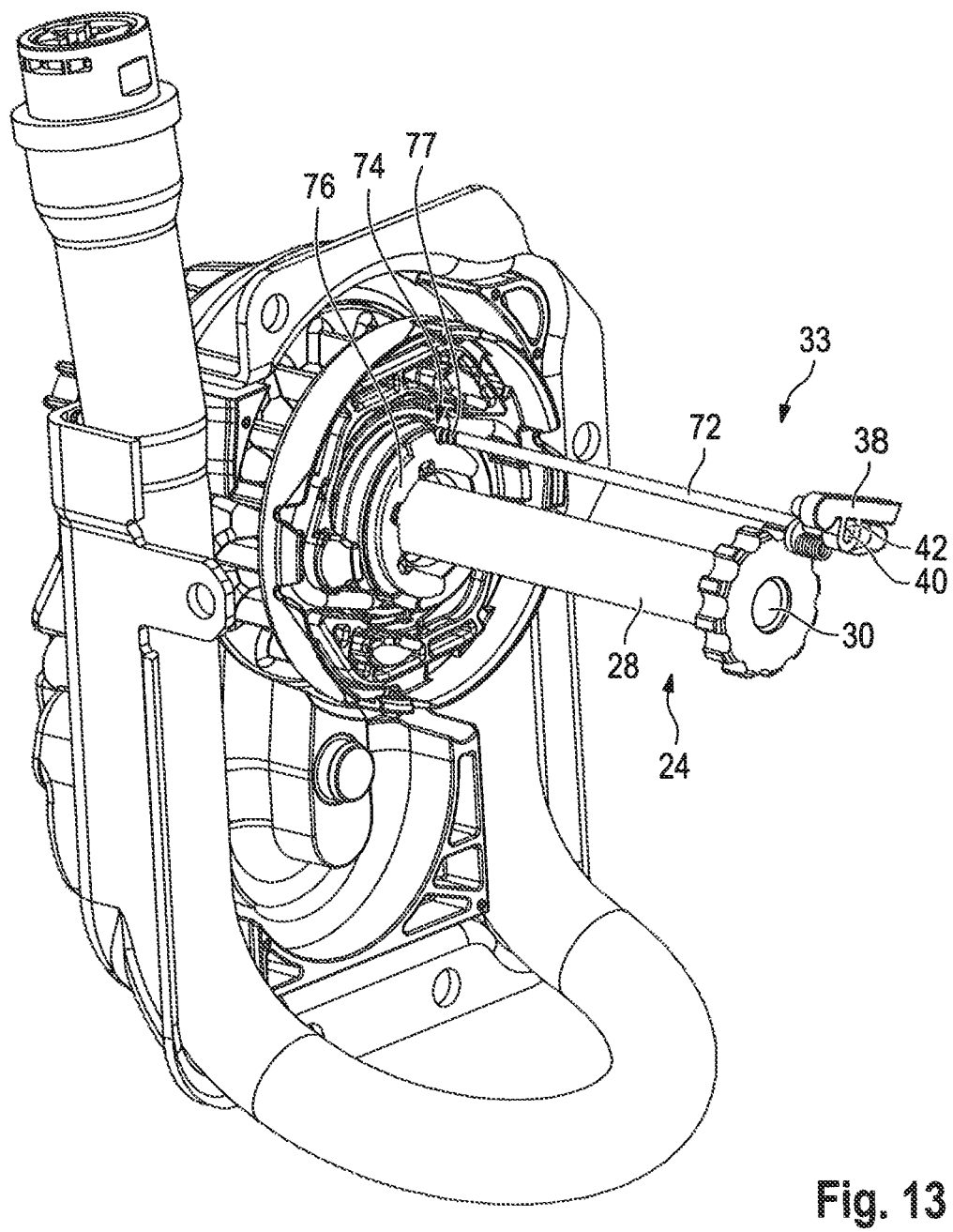
FIG. 13 shows a belt retractor according to the invention according to a third embodiment based on a separation principle.
Figure 14:
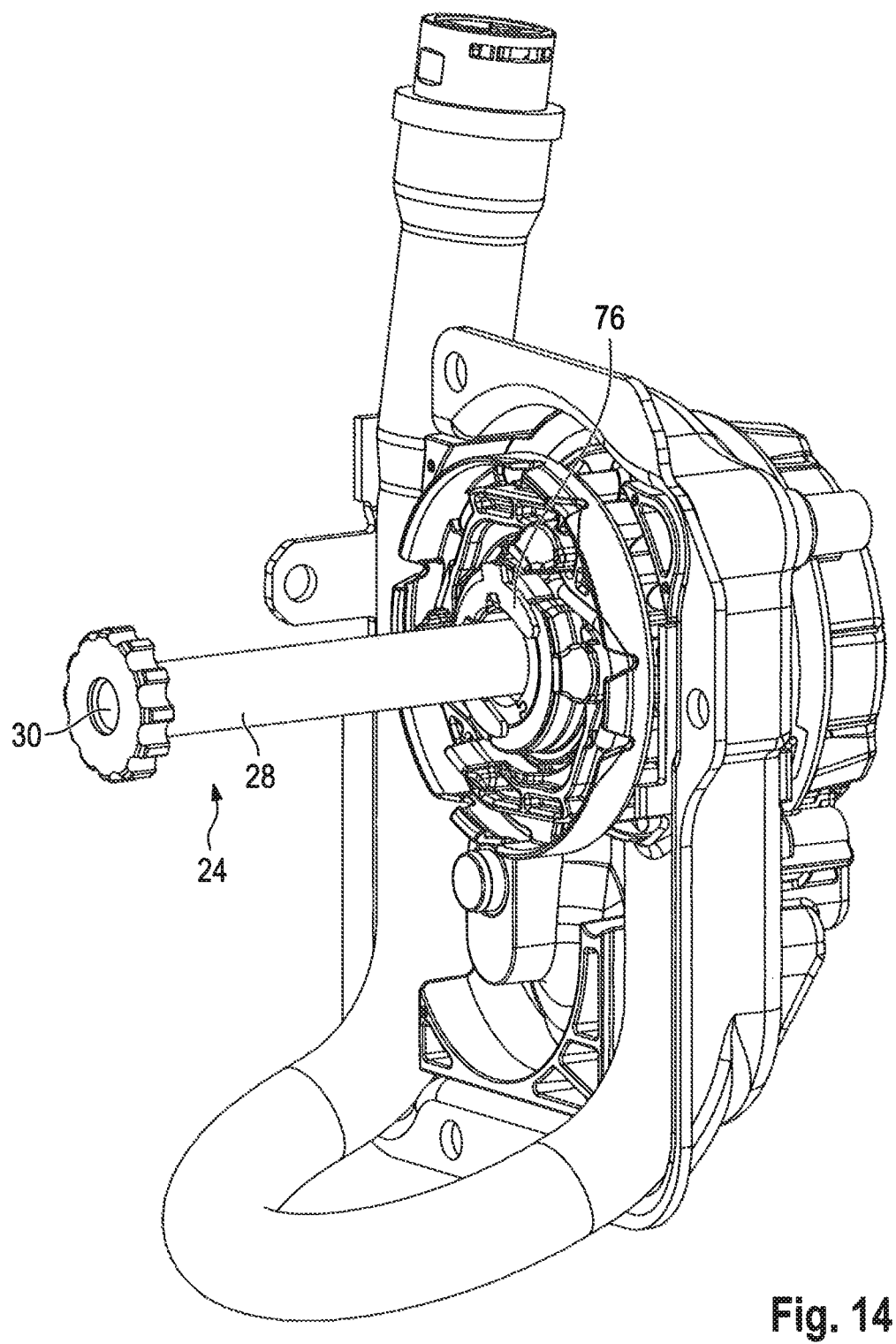
FIG. 14 shows a further view of a belt retractor according to the invention according to the third embodiment.
Figure 15:
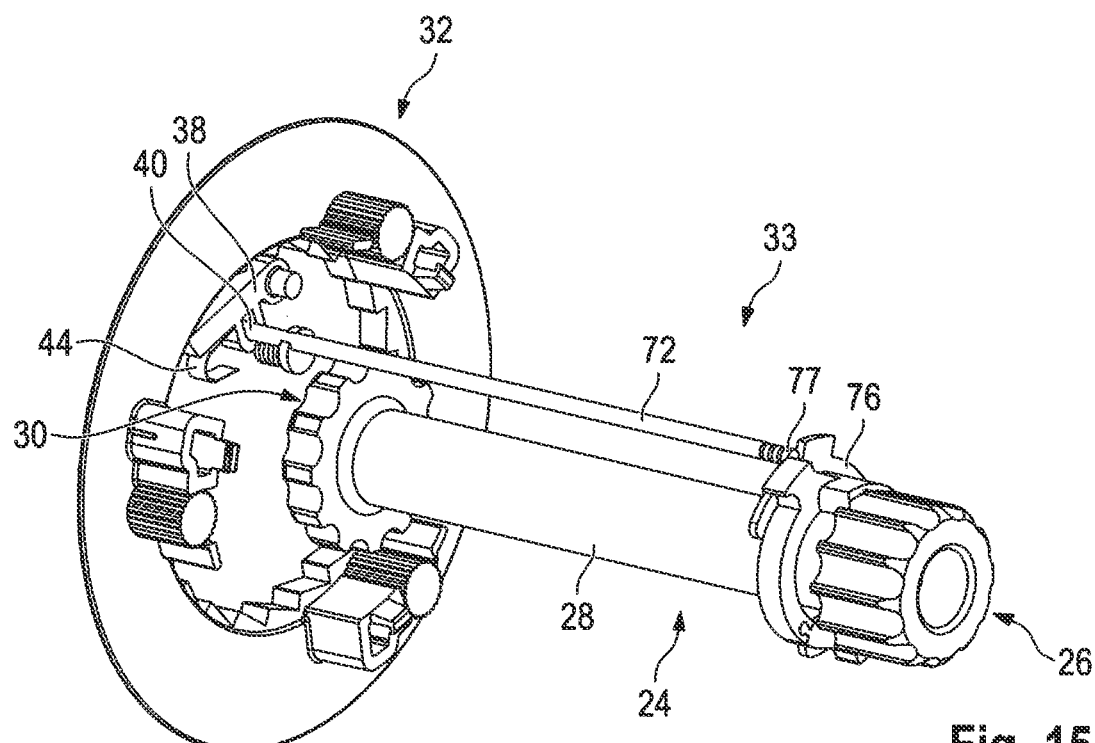
FIG. 15 shows a view of a detail of a belt retractor according to the invention according to the third embodiment.
Figure 16:
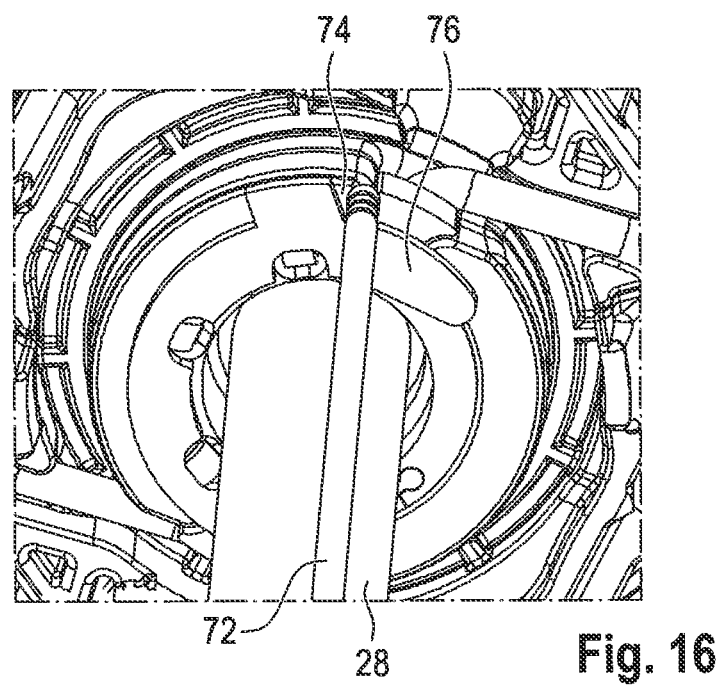
FIG. 16 shows a further view of a detail of a belt retractor according to the invention according to the third embodiment.
Figure 17:
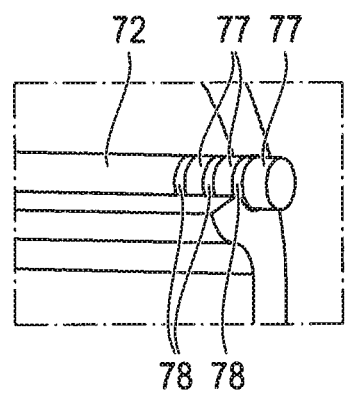
FIG. 17 shows an additional view of a detail of a belt retractor according to the invention according to the third embodiment.
Figure 18:
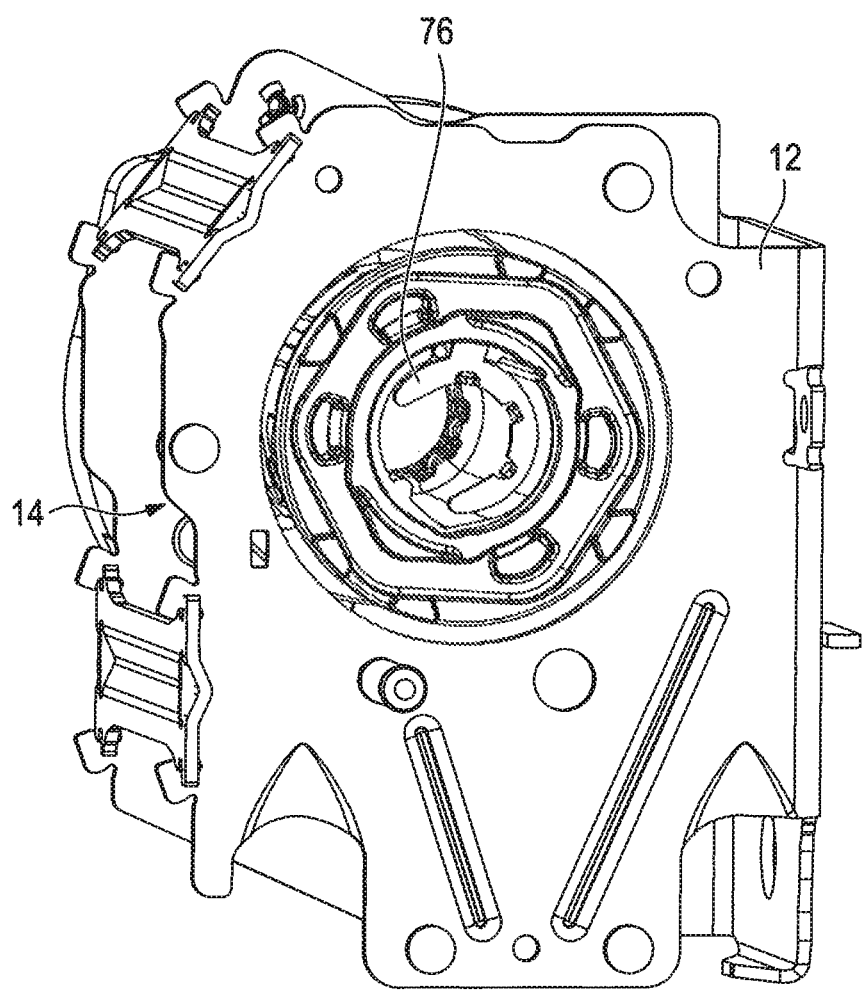
FIG. 18 shows a perspective side view of a belt retractor according to the invention according to the third embodiment.
Figure 19:
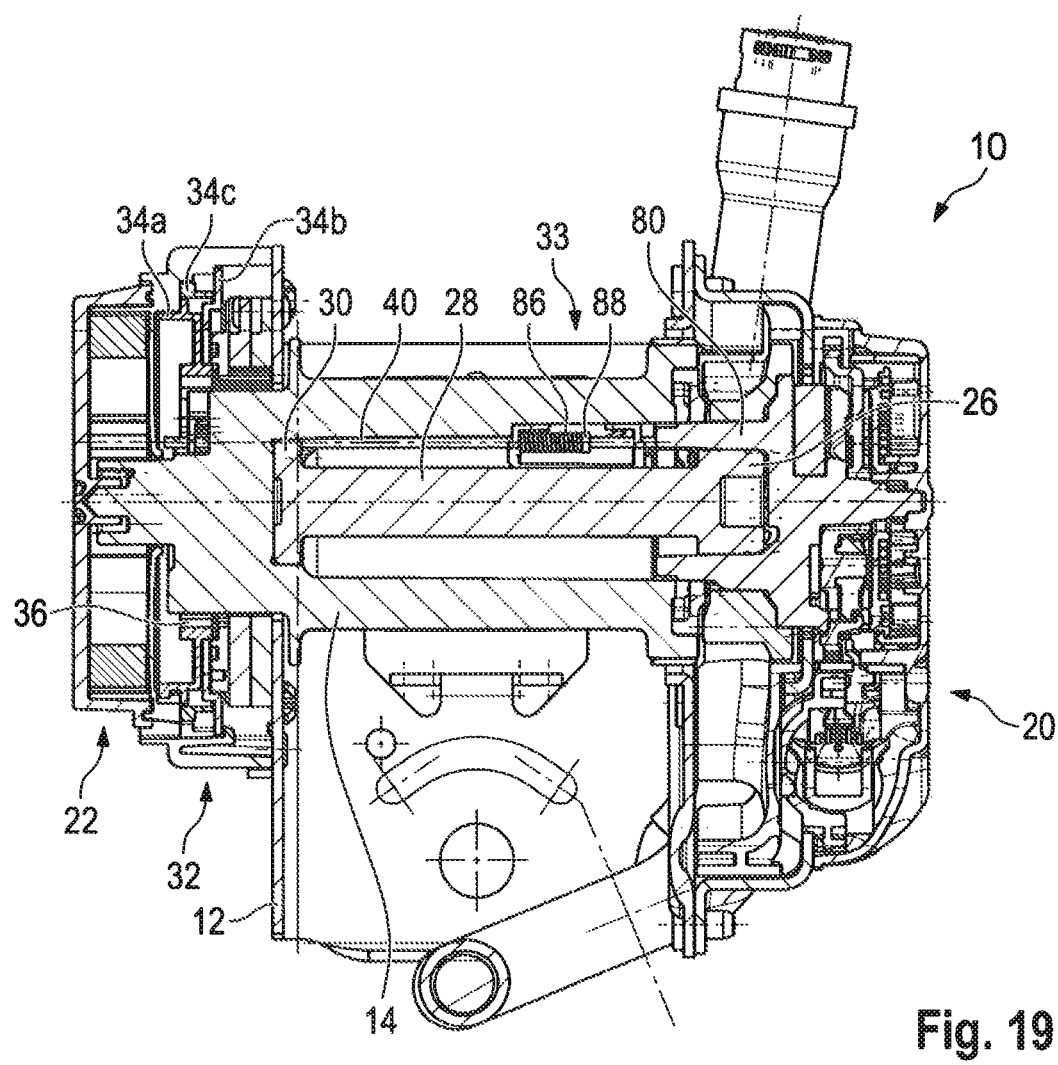
FIG. 19 shows a sectional view of a belt retractor according to the invention according to a fourth embodiment.

The actuating contour 67 includes a ramp in the embodiment shown see in particular FIG. 12).

If the locking-mechanism-side end 26 and the belt-reel-side end 30 of the torsion rod 28 are rotated in relation to one another in such a manner that the ramp cooperates with the actuating-disk-side end 66 of the latching element 60, the latching element 60 is displaced in opposition to the force of the spring 68. In this case, the latching-continuation-side end 62 travels over, for example, a tooth of the latching toothing 58.

If the actuating contour 67 is rotated further so that the actuating-disk-side end 66 no longer engages the ramp, the latching element 60 is moved back in the direction of the actuating disk 64 by the spring 68. In this case, the latching-continuation-side end 62 entrains the latching projection 56.

In the embodiment shown, with each full relative rotation of the actuating disk 64, the latching continuation 56, and consequently the locking pin 40, is therefore pulled out of the retaining opening 42 by an increment.

The actuating contour 67 of the actuating disk 64, in this case, is designed such that after the predefined number of revolutions, the locking pin 40 is removed fully from the retaining opening 42. The pawl then engages in the toothing 36 and the stopping mechanism 22 is in its stopped state.

A third embodiment of the belt retractor 10 is shown in FIGS. 13-18. Said embodiment differs from the first and the second embodiment of the belt retractor 10 with regard to the counting mechanism 33.

The counting mechanism 33 here includes a locking pin continuation 72 which is arranged on the locking pin 40.

The locking pin continuation 72 extends, in this case, up to a contact surface 74 which is coupled non-rotatably with the locking-mechanism-side end 26 of the torsion rod 28. It therefore extends substantially over the entire length of the torsion rod 28.

The locking pin continuation 72 is spring-loaded in the direction of the contact surface 74 so that it always abuts against the contact surface 74. The associated spring is not shown in the figures.

Furthermore, said embodiment includes a cutting disk 76 which is also connected non-rotatably to the locking-mechanism-side end 26. The cutting disk 76, in this case, is at a spacing from the contact surface 74 in the direction of the pawl 38.

The contact surface 74 and the cutting disk 76 can be arranged in particular on a locking disk (not shown further) of the locking mechanism 20.

The locking pin continuation 72, in this case, is mounted in a guide which is fixed with reference to the belt reel 14. The guide can also be arranged, in this case, in a housing (not shown in any detail).

The method of operation of the counting mechanism 33 is as follows.

Proceeding with the locking mechanism 20 in a locked state and the stopping mechanism 22 in a released state where the locking pin 40 is arranged in the retaining opening 42, the locking-mechanism-side end 26 of the torsion rod 28 is fixed on the frame 12.

The contact surface 74 and the cutting disk 76 are consequently also connected non-rotatably to the frame 12.

Within the framework of the belt force limitation, however, the belt-reel-side end 30, the belt reel 14 and consequently also the locking pin 40 and the locking pin continuation 72 can also be rotated relative to the locking-mechanism-side end 26.

In the case of such a rotation, the locking pin continuation 72 runs circumferentially against the cutting disk 76 in a predefined position so that a segment 77, which corresponds substantially in its length to the distance between the cutting disk 76 and the contact surface 74, is severed from the locking pin continuation 72.

The cutting disk 76 is realized with sharp edges at the corresponding positions for this reason.

The locking pin continuation 72 is shortened as a result and is moved by a section which corresponds to the length of the severed segment 77 in the direction of the locking-mechanism-side end 26.

The cutting disk 76, the locking pin continuation 72 and the contact surface 74 are set up, in this case, such that after the predefined number of revolutions a sufficient quantity of segments 77 are severed from the locking pin continuation 72 so that the locking pin 40 is removed from the retaining opening 42.

The pawl 38 then engages in the toothing 36 and the stopping mechanism 22 is situated in the stopped state.

The segments 77 of the locking pin continuation 72 which are to be severed individually can be separated from one another by notches 78. The cutting disk 76 then severs the segments 77 from the remainder of the locking pin continuation 72 preferably in the region of the notches 78.

FIGS. 19 to 26 show a fourth embodiment of the belt retractor 10.

In this case, the counting mechanism 33 includes a triggering disk 80 which is arranged substantially coaxially to the torsion rod 28 and is connected non-rotatably to the locking-mechanism-side end 26 of the torsion rod 28.

The triggering disk 80 can be formed integrally with other components of the locking mechanism 20.

Figure 20:
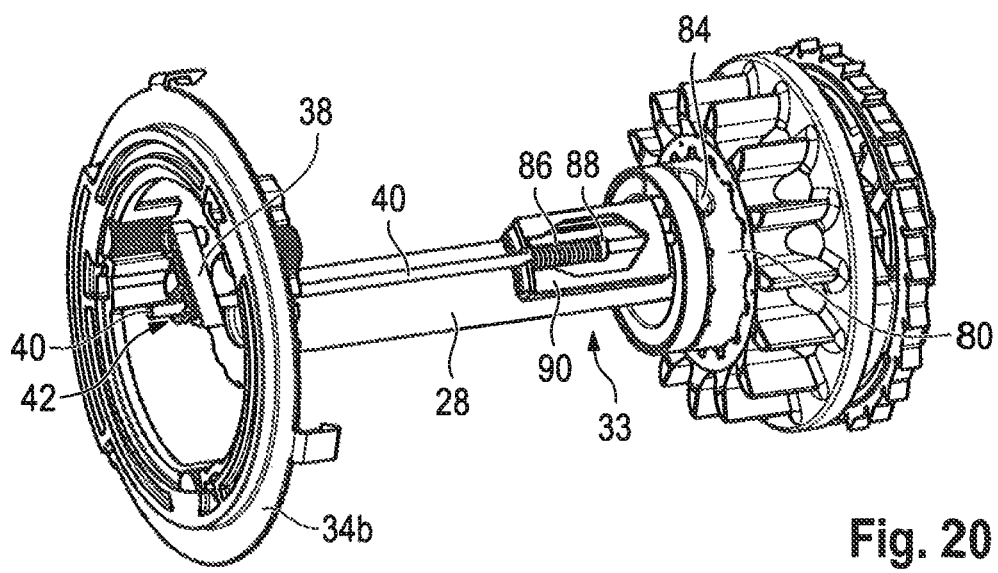
FIG. 20 shows a view of a detail of a belt retractor according to the invention according to the fourth embodiment.
Figure 21:
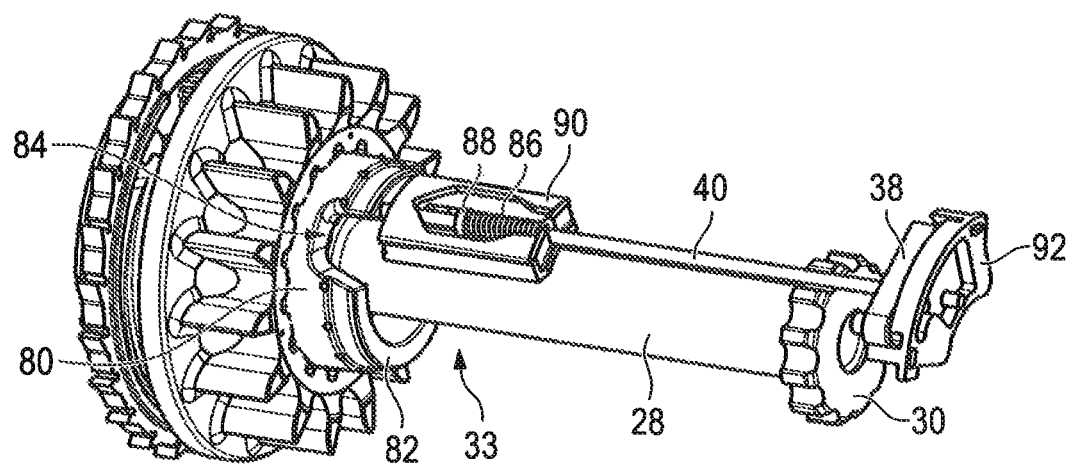
FIG. 21 shows a further view of a detail of a belt retractor according to the invention according to the fourth embodiment.

The triggering disk 80 comprises a retaining surface 82 which extends substantially around the torsion rod 28 and against which, in the released state, an end of the locking pin 40 remote from the pawl 38 abuts (see in particular FIG. 20 and FIG. 21).

Figure 22:
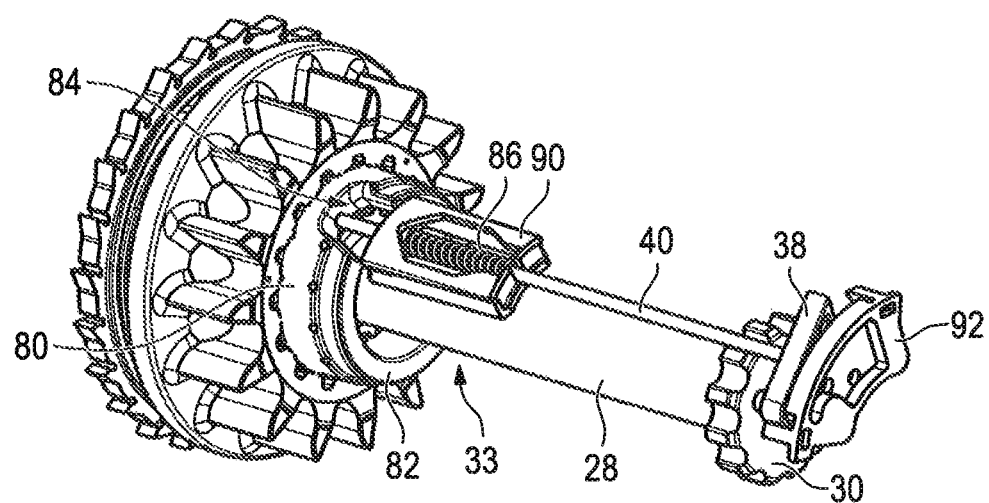
FIG. 22 shows an additional view of a detail of a belt retractor according to the invention according to the fourth embodiment.
Figure 23:
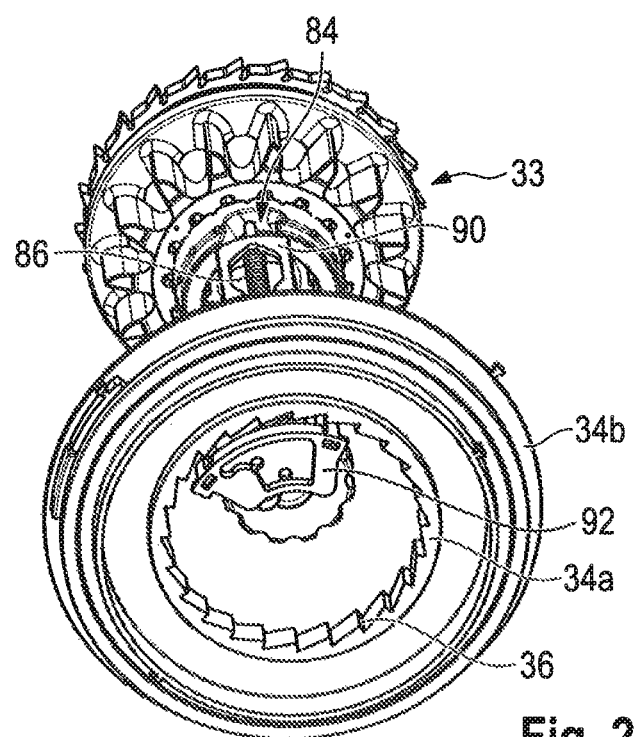
FIG. 23 shows another view of a detail of a belt retractor according to the invention according to the fourth embodiment.
Figure 24:
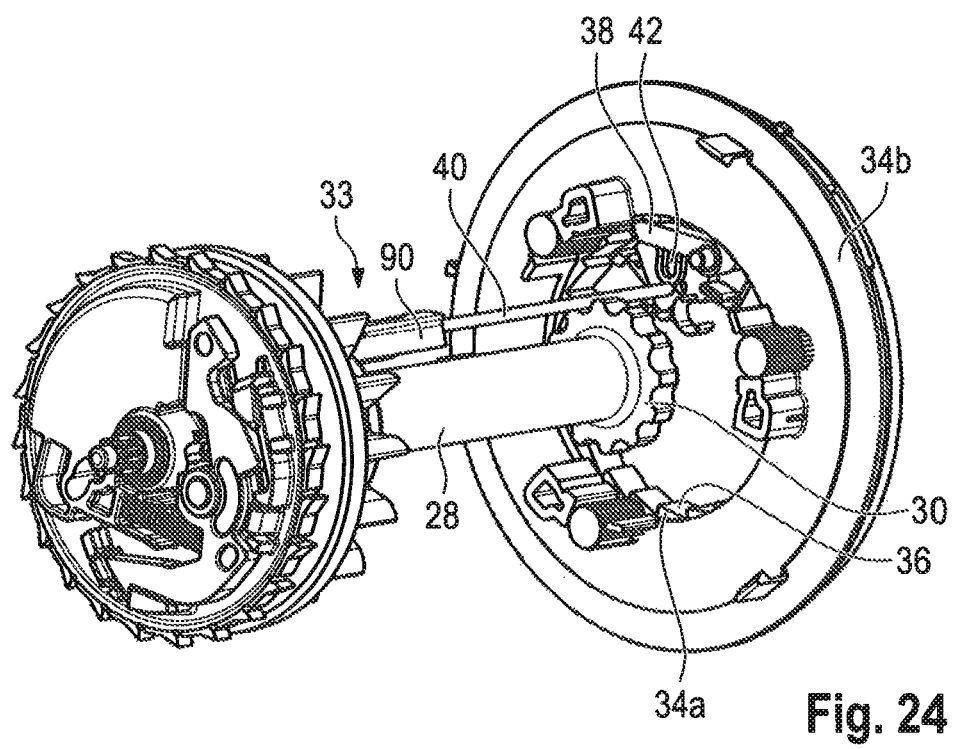
FIG. 24 shows a supplementary view of a detail of a belt retractor according to the invention according to the fourth embodiment.
Figure 25:
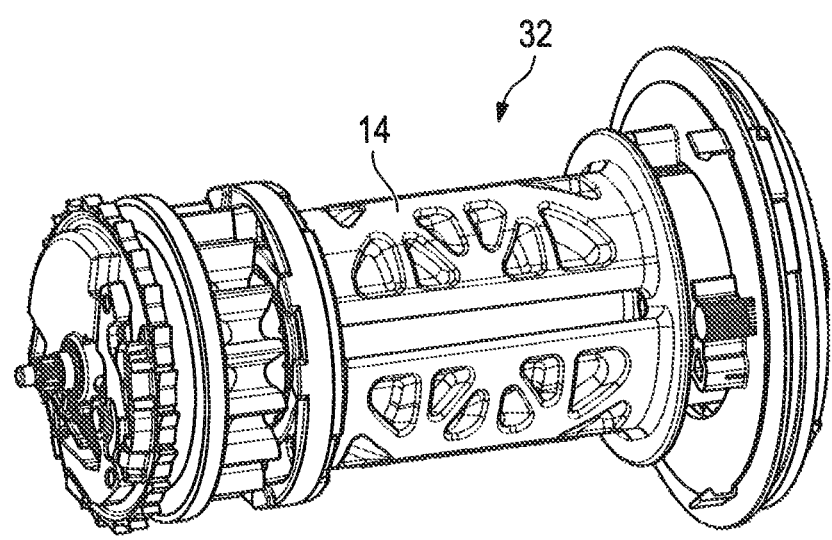
FIG. 25 shows a further view of a detail of a belt retractor according to the invention according to the fourth embodiment and FIG. 26 shows a side view of a belt retractor according to the invention according to the fourth embodiment.
Figure 26:
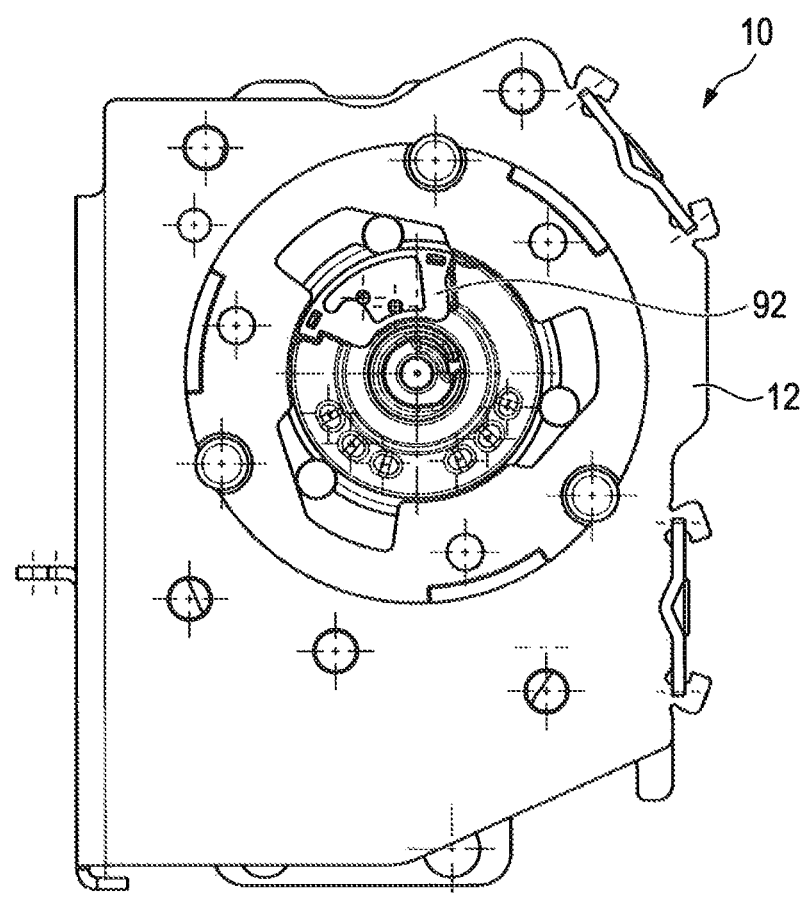

In addition, the triggering disk 80 includes an indentation 84 which interrupts the retaining surface 82 and in which the end of the locking pin 40 remote from the pawl 38 engages in the stopped state (see in particular FIG. 22 and FIG. 23). This results in the locking pin no longer engaging in the retaining opening 42 of the pawl 38 and releasing it.

In the embodiment shown in FIGS. 19 to 26, the retaining surface extends around substantially 301°. The indentation 84 supplements this to form a full ring, extending therefore substantially 59° around the torsion rod 28.

The locking pin 40 is pretensioned by means of a spring 86 in the direction of the triggering disk 80. Consequently, the end of the locking pin 40 remote from the pawl 38 always abuts reliably against the retaining surface 82 or the indentation 84.

The spring 86, in this case, can act on a collar 88 which is provided on the locking pin 40.

Additionally, in the present embodiment, the spring 86 is arranged in a housing 90 which is mounted on the belt reel 14 and is preferably produced from plastics material.

At the same time, the locking pin 40 extends substantially parallel to the torsion rod 28 and is mounted on the belt reel 14.

The pawl 38 is additionally retained in the present embodiment by means of a safety element 92.

The safety element 92, in this case, serves for the bearing arrangement of the pawl 38 and of the end of the locking pin 40 which engages in said pawl. In this case, the safety element 92 is not specific to the fourth embodiment. It is able to be used in conjunction with all named embodiments.

In addition, an actuating mechanism of the clutch 32 is shown in the fourth embodiment of the belt retractor 10. Said actuating mechanism is also able to be used in conjunction with all embodiments.

It includes a first actuating disk 34a, a second actuating disk 34b and a third actuating disk 34c of the clutch 32. In this case, the third actuating disk 34c is interposed between the first actuating disk 34a and the second actuating disk 34b.

The toothing 36, in which the pawl 38 engages in the stopped state, is provided on the first actuating disk 34a.

In the stopped state, the first actuating disk 34a is rotated by a predefined first rotational angle in relation to the second actuating disk 34b and both actuating disks 34a, 34b are rotationally coupled in an actuating direction of the clutch 32.

Additionally, in the stopped state, the third actuating disk 34c is rotated by a predefined rotational angle in relation to the first actuating disk 34a and the third actuating disk is rotationally coupled with the first actuating disk 34a in the stopped state in an actuating direction of the clutch 32.

The same applies to the second and the third actuating disks 34b, 34c: In the stopped state, the second actuating disk 34b is rotated by a predefined third rotational angle in relation to the third actuating disk 34c and the second actuating disk is rotationally coupled with the third actuating disk 34c in an actuating direction.

Proceeding from the first actuating disk 34a which is rotationally blocked by means of the pawl 38, the clutch 32 is therefore actuated by means of the second actuating disk 34b and the third actuating disk 34c, that is to say is transferred into a state in which it fixes the belt reel 14 to the frame 12.

With the stopping mechanism 22 in the released state, the first actuating disk 34a is rotatable by the predefined first rotational angle in relation to the second actuating disk 34b in the actuating direction of the clutch 32.

The third actuating disk 34c is also rotatable in the released state by the predefined second rotational angle in relation to the first actuating disk 34a in the actuating direction of the clutch 32 and the third actuating disk 34c is rotatable by the predefined third rotational angle in relation to the second actuating disk 34b.

The first, the second and the third rotational angles consequently supplement the rotational angles about which the torsion rod 28 is able to be rotated before the clutch 32 fixes the belt-reel-side end 30 to the frame 12.

In other words, the actuating disks 34a, 34b, 34c realize a secondary counting mechanism, by means of which the angles or numbers of revolutions which can be recorded by means of the counting mechanism 33 are able to be supplemented.

The invention claimed is:

1. A belt retractor (10) for a seat belt of a motor vehicle, having a belt reel (14) which is mounted in a frame (12) so as to be rotatable in an unwinding direction (16) and a winding direction (18), which is in the opposite direction to the unwinding direction (16), and is non-rotatably connected to a belt-reel-side end (30) of a torsion rod (28) which is arranged substantially coaxially to the belt reel (14),
   wherein the torsion rod (28) is operatively connected by way of a locking-mechanism-side end (26), which is opposite the belt-reel-side end (30), to a locking mechanism (20) and, with the locking mechanism (20) in a locked state, the locking-mechanism-side end (26) of the torsion rod (28) is fixed to the frame (12) so as to be non-rotatable in the unwinding direction (16),
   wherein in the locked state, with the torsion rod (28) under torsion, the belt-reel-side end (30) is rotatable in the unwinding direction (16) relative to the locking-mechanism-side end (26),
   wherein the belt reel (14), with a stopping mechanism (22) in a stopped state, is fixed to the frame (12) so as to be non-rotatable in the unwinding direction (16), and
   wherein the stopped state is set up when the belt-reel-side end (30) is twisted by a predefined number of revolutions in relation to the locking-mechanism-side end (26), with the locking mechanism (20) in the locked state,
   wherein the stopping mechanism (22) includes a pawl (38) which is mounted on the belt reel (14),
   and with the stopping mechanism (22) in a released state, the pawl (38) is retained in such a manner by a locking pin (40) that it does not engage in the toothing (36),
   wherein the locking pin (40) is mounted so as to be displaceable in the belt reel (14),
   wherein in the released state the locking pin (40) is arranged in a retaining opening (42) of the pawl (38) and in the stopped state it is arranged outside the retaining opening (42),
   and wherein a counting mechanism (33) is provided which is set up for the purpose of removing the locking pin (40) from the retaining opening (42) when the belt-reel-side end (30) is twisted by the predefined number of revolutions in relation to the locking-mechanism-side end (26).

2. The belt retractor (10) as claimed in claim 1, wherein in the stopped state, the belt reel (14) is fixed on a side of the frame (12) opposite the locking mechanism (20).

3. The belt retractor (10) as claimed in claim 1, wherein in the stopped state the pawl (38) engages in a toothing (36) of an actuating disk (34) of a clutch (32) and the clutch (32) couples the belt reel (14) with the frame (12) so as to be non-rotatable in the unwinding direction (16), in particular wherein the pawl (38) is spring-loaded in the direction of the toothing (36).

4. The belt retractor (10) as claimed in claim 3, wherein the actuating disk (34) is a first actuating disk (34a) and, in the stopped state, the first actuating disk is rotated by a predefined first rotational angle relative to a second actuating disk (34b) of the clutch (32), wherein, in the stopped state, the first actuating disk (34a) and the second actuating disk (34b) are rotationally coupled in an actuating direction of the clutch (32).

5. The belt retractor (10) as claimed in claim 4, wherein, with the stopping mechanism (22) in a released state, the first actuating disk (34a) and the second actuating disk (34b) are rotatable by the predefined first rotational angle relative to one another in the actuating direction of the clutch (32).

6. The belt retractor (10) as claimed in claim 4, wherein a third actuating disk (34c) of the clutch (32) is interposed between the first actuating disk (34a) and the second actuating disk (34b), wherein in the stopped state the third actuating disk (34c) is rotated by a predefined second rotational angle in relation to the first actuating disk (34a) and in the stopped state the third actuating disk is rotationally coupled with the first actuating disk (34a) in an actuating direction of the clutch (32), and wherein in the stopped state the second actuating disk (34b) is rotated by a predefined third rotational angle in relation to the third actuating disk (34c) and in the stopped state the second actuating disk is rotationally coupled with the third actuating disk (34c) in an actuating direction of the clutch (32).

7. The belt retractor (10) as claimed in claim 6, wherein the third actuating disk (34c) and the first actuating disk (34a), with the stopping mechanism (22) in a released state, are rotatable by the predefined second rotational angle in relation to one another in the actuating direction of the clutch (32) and the third actuating disk (34c) and the second actuating disk (34b), with the stopping mechanism (22) in a released state, are rotatable by the predefined third rotational angle in relation to one another in the actuating direction of the clutch (32).

8. The belt retractor (10) as claimed in claim 7, wherein the counting mechanism (33) includes a latching continuation (56) which is arranged on the locking pin (40), a latching element (60) and an actuating disk (64) which is arranged substantially coaxially to the torsion rod (28), wherein the latching element (60) is arranged so as to be functional between the latching continuation (56) and the actuating disk (64).

9. The belt retractor (10) as claimed in claim 8, wherein the actuating disk (64) is coupled non-rotatably with the locking-mechanism-side end (26) of the torsion rod (28), in particular wherein the actuating disk (64) is arranged on a locking disk of the locking mechanism (20).

10. The belt retractor (10) as claimed in claim 8, wherein the latching element (60) engages by way of a latching-continuation-side end in a latching toothing (58) which is arranged on the latching continuation (56), in particular wherein the latching-continuation-side end (62) is realized as a resilient latching arm.

11. The belt retractor (10) as claimed in claim 10, wherein the latching toothing (58) is designed in such a manner that the latching element (60) is displaceable in a direction of extraction (70) of the locking pin (40) relative to the latching continuation (56) only under entrainment of the latching continuation (56) and in a direction opposite to the direction of extraction (70) by traveling over part of the latching toothing (58).

12. The belt retractor (10) as claimed in claim 11, wherein in the stopped state, the latching continuation (56) is displaced so far in the direction of the direction of extraction (70) that the locking pin (40) is removed from the retaining opening (42).

13. The belt retractor (10) as claimed in claim 11, wherein in the released state the latching continuation (56) is not displaced or is displaced to a maximum extent in the direction of the direction of extraction (70) that the locking pin (40) is arranged in the retaining opening (42).

14. The belt retractor (10) as claimed in one of claim 8, wherein the latching element (60) abuts against an actuating contour (67) of the actuating disk (64) by way of an actuating-disk-side end (66), wherein the latching element (60) is spring-loaded in the direction of the actuating disk (64).

15. The belt retractor (10) as claimed in claim 14, wherein the latching element (60) is displaceable relative to the latching continuation (56) by means of the actuating contour (67).

16. The belt retractor (10) as claimed in claim 15, wherein the actuating contour (67) is matched to the predefined number of revolutions.

17. The belt retractor (10) as claimed in claim 8, wherein the latching continuation (56) and the latching element (60) are arranged in a housing (69) which is immovable relative to the belt reel (14), in particular wherein the latching continuation (56) and the latching element (60) extend substantially parallel.

18. The belt retractor (10) according to claim 1, wherein the counting mechanism (33) includes a thread (50) and a winding disk (52) which is arranged substantially coaxially to the torsion rod (28), wherein the thread (50) is connected to the locking pin (40) at one end and to the winding disk (52) at another end.

19. The belt retractor (10) as claimed in claim 18, wherein the winding disk (52) is coupled non-rotatably with the locking-mechanism-side end (26) of the torsion rod (28), in particular wherein the winding disk (52) is arranged on a locking disk of the locking mechanism (20).

20. The belt retractor (10) as claimed in claim 18, wherein the thread (50) includes a thread reserve (53) which is arranged, in the released state, between the locking pin (40) and the winding disk (52).

21. The belt retractor (10) as claimed in claim 20, wherein the thread reserve (53) is wound on the winding disk (52) in the stopped state and the size of a free length of the thread is such that the locking pin (40) is removed from the retaining opening (42).

22. The belt retractor (10) as claimed in claim 20, wherein a length of the thread reserve (53) is matched to the predefined number of revolutions.

23. The belt retractor (10) as claimed in claim 18, wherein the thread (50) is arranged in a housing (54) which is connected non-rotatably to the belt reel (14).

24. The belt retractor (10) according to claim 1, wherein the counting mechanism (33) includes a locking pin continuation (72) which is arranged on an end of the locking pin (40) remote from the pawl (38), a contact surface (74) and a cutting disk (76), wherein the locking pin continuation (72) abuts against the contact surface (74).

25. The belt retractor (10) as claimed in claim 24, wherein the contact surface (74) and the cutting disk (76) are coupled non-rotatably with the locking-mechanism-side end (26) of the torsion rod (28), in particular wherein the contact surface (74) and the cutting disk (76) are arranged on a locking disk of the locking mechanism (20).

26. The belt retractor (10) as claimed in claim 24, wherein the cutting disk (76) is at a spacing from the contact surface (72) in a direction of extension of the locking pin continuation (72).

27. The belt retractor (10) as claimed in one of claim 24, wherein the locking pin continuation (72) is spring-loaded in the direction of the contact surface (74).

28. The belt retractor (10) as claimed in one of claim 24, wherein the cutting disk (76) is realized for the purpose of severing a segment (77) from the locking pin continuation (72) when the locking pin (40) is moved relative to the cutting disk (76).

29. The belt retractor (10) as claimed in claim 28, wherein the segment (77) is defined in the locking pin continuation (72) by a notch (78), wherein the separation is effected in the region of the notch (78).

30. The belt retractor (10) as claimed in claim 28, wherein one or multiple segments (77) are severed in the stopped state so that the locking pin (40) is removed from the retaining opening (42).

31. The belt retractor (10) as claimed in claim 28, wherein no segments (77) or so few segments (77) are severed in the released state that the locking pin (40) is arranged in the retaining opening (42).

32. The belt retractor (10) according to claim 1, wherein the counting mechanism (33) includes a triggering disk (80) which is arranged substantially coaxially to the torsion rod (28) and is connected non-rotatably to the locking-mechanism-side end (26) of the torsion rod (28), wherein the triggering disk (80) comprises a retaining surface (82), which extends substantially around the torsion rod (28) and against which, with the stopping mechanism (22) in the released state, abuts against an end of the locking pin (40) which is remote from the pawl (38), and wherein the triggering disk (80) includes an indentation (84) which interrupts the retaining surface (82) and in which the end of the locking pin (40) remote from the pawl (38) engages in the stopped state.

33. The belt retractor (10) as claimed in claim 32, wherein the retaining surface (82) extends around the torsion rod (28) substantially by between 290° and 310°, wherein the indentation (84) extends around the torsion rod (28) substantially by between 50° and 70°.

34. The belt retractor (10) as claimed in claim 32, wherein the locking pin (40) is pre-stressed in the direction of the triggering disk (80), is pre-stressed in particular by means of a spring (86).

35. The belt retractor (10) as claimed in claim 32, wherein the locking pin (40) extends substantially parallel to the torsion rod (28) and is mounted on the belt reel (14).

* * * * *